Figure 1:
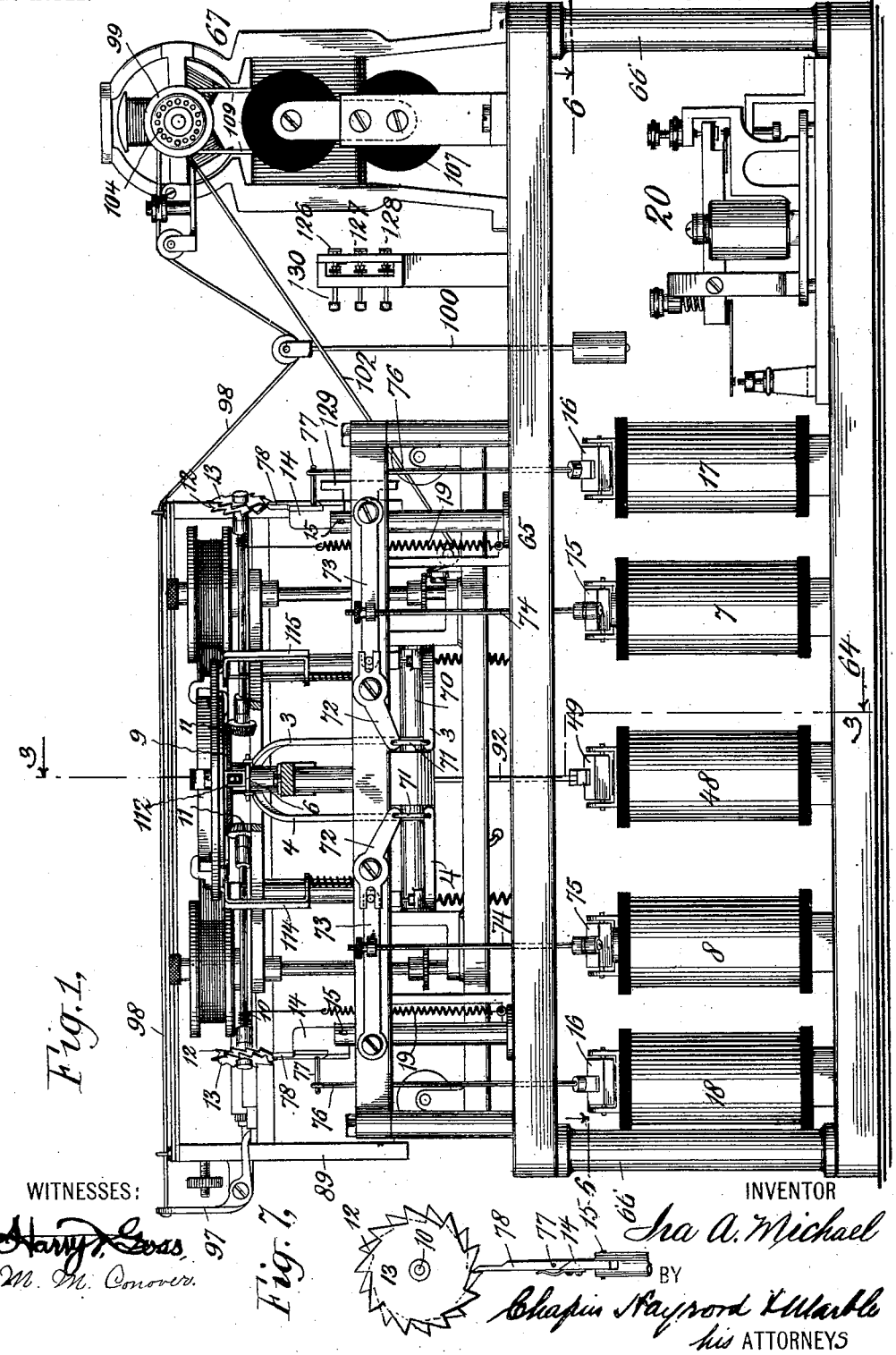

No. 748,970. PATENTED JAN. 5, 1904.
I. A. MICHAEL.
AUTOMATIC SIGNALING APPARATUS.
APPLICATION FILED JUNE 27, 1902.
NO MODEL. 8 SHEETS—SHEET 1.

WITNESSES: INVENTOR
Ira A. Michael
BY
his ATTORNEYS

No. 748,970. PATENTED JAN. 5, 1904.
I. A. MICHAEL.
AUTOMATIC SIGNALING APPARATUS.
APPLICATION FILED JUNE 27, 1902.
NO MODEL. 8 SHEETS—SHEET 2.
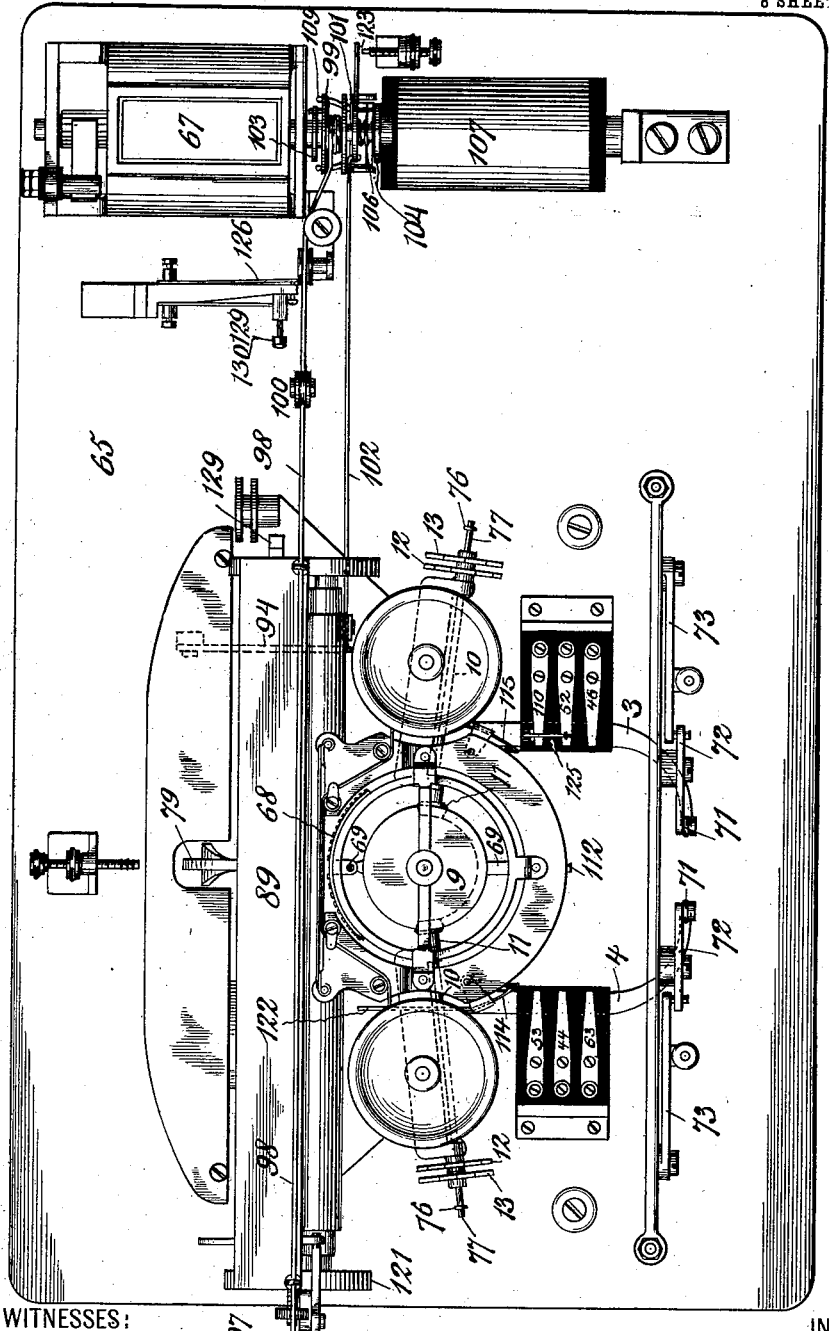
WITNESSES: INVENTOR
Ira A. Michael
BY
Chapin Hayford & Marble
his ATTORNEYS No. 748,970. PATENTED JAN. 5, 1904.
I. A. MICHAEL.
AUTOMATIC SIGNALING APPARATUS.
APPLICATION FILED JUNE 27, 1902.
NO MODEL. 8 SHEETS—SHEET 3.
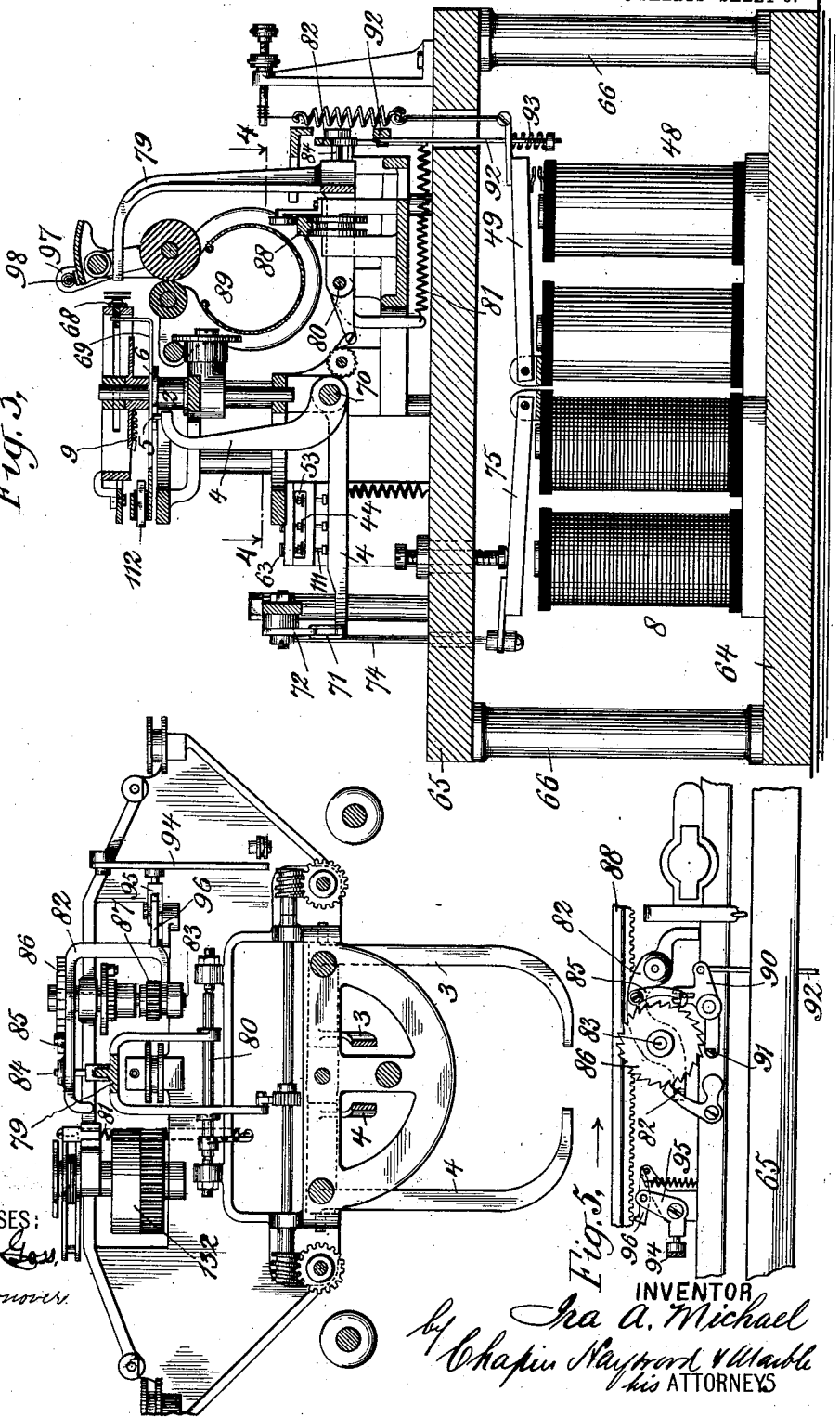

No. 748,970. PATENTED JAN. 5, 1904.
I. A. MICHAEL.
AUTOMATIC SIGNALING APPARATUS.
APPLICATION FILED JUNE 27, 1902.
NO MODEL. 8 SHEETS—SHEET 4.
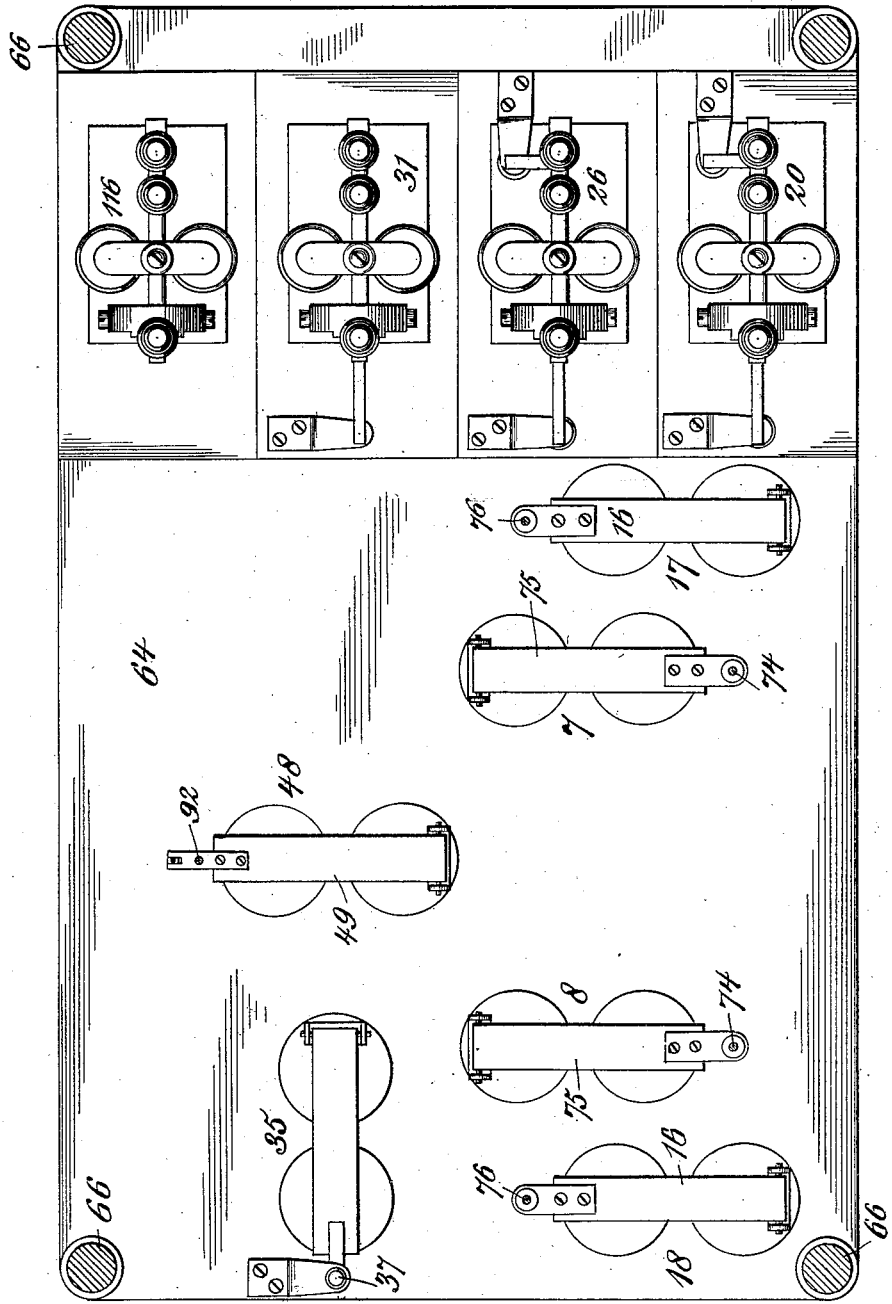

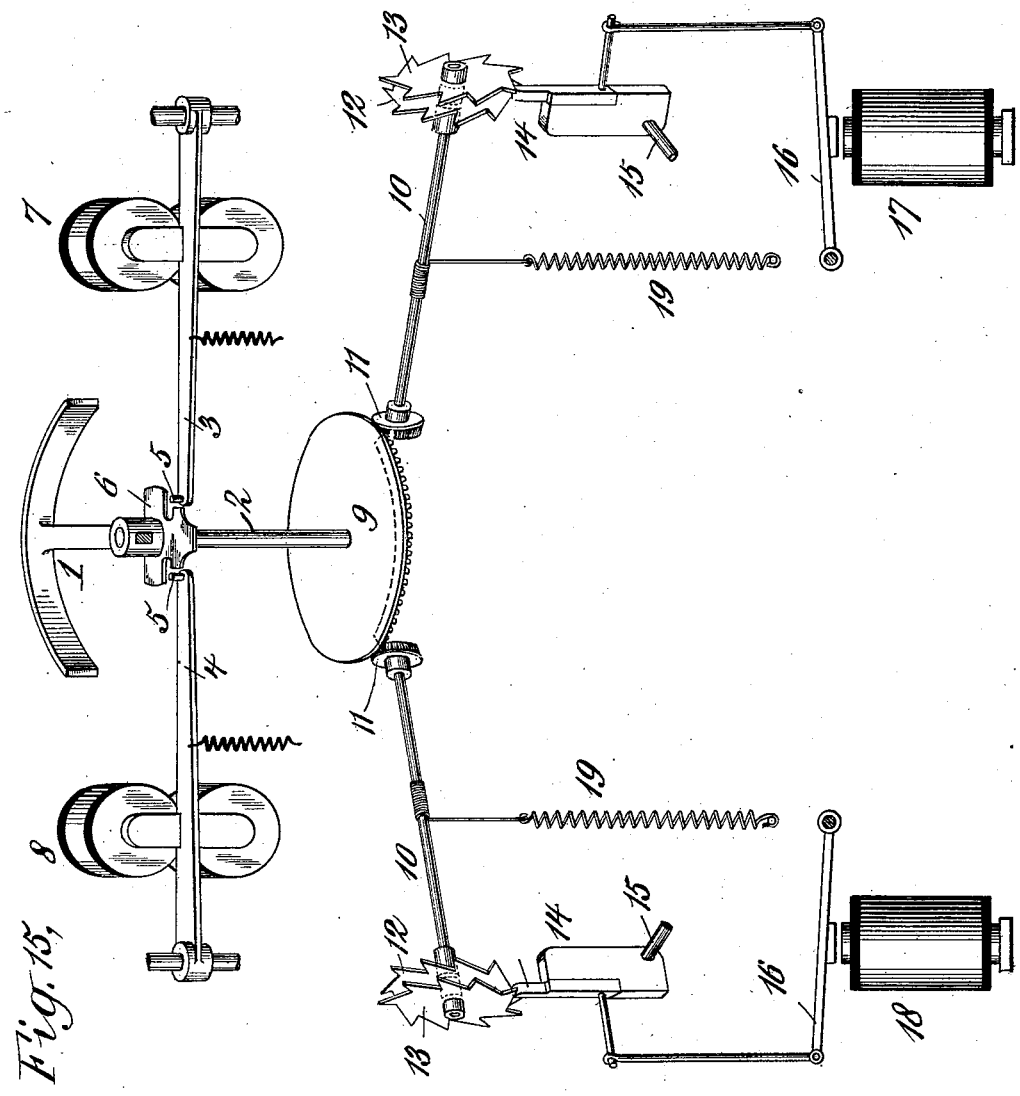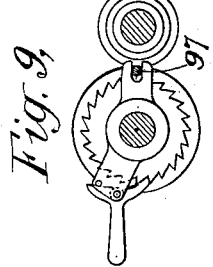

No. 748,970. PATENTED JAN. 5, 1904.
I. A. MICHAEL.
AUTOMATIC SIGNALING APPARATUS.
APPLICATION FILED JUNE 27, 1902.
NO MODEL. 8 SHEETS—SHEET 6.
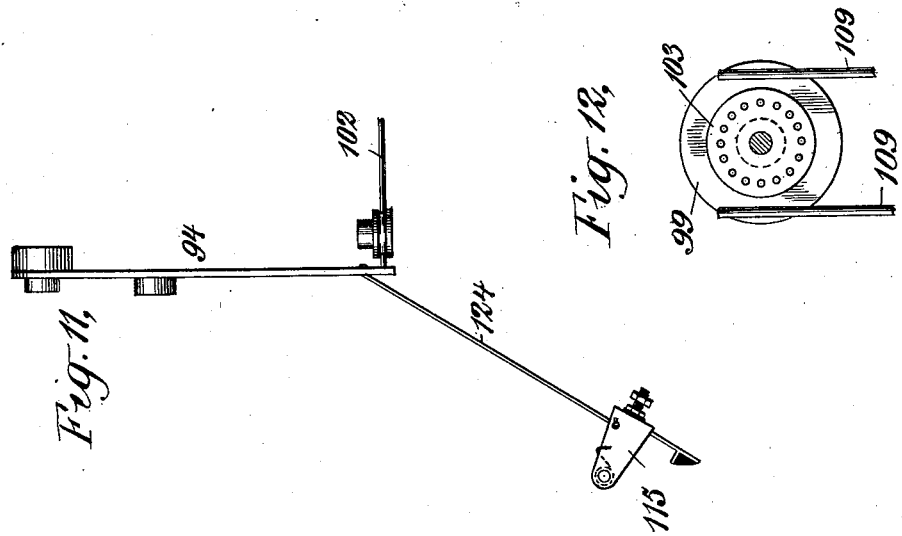
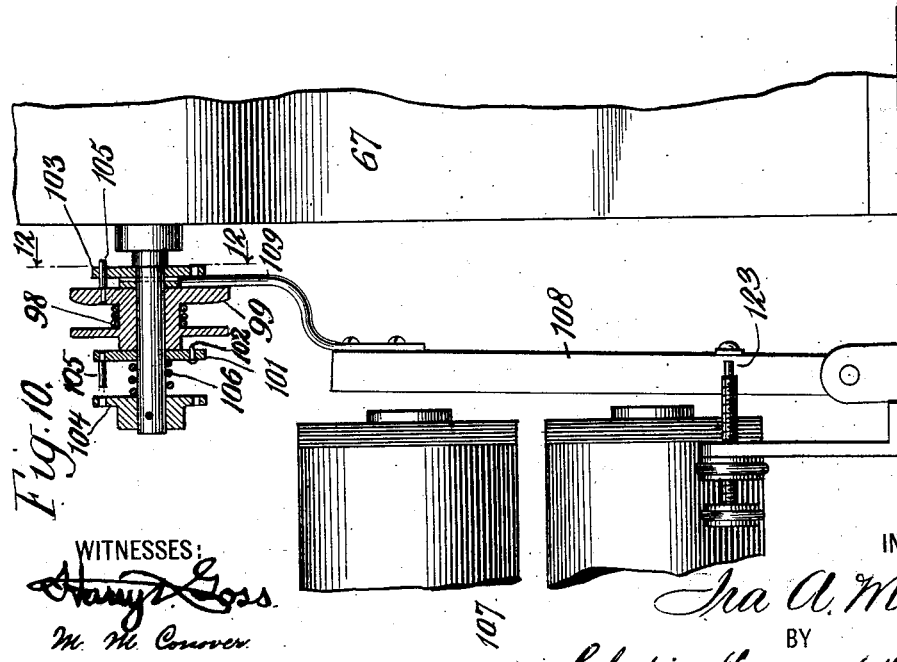
WITNESSES:
INVENTOR
Ira A. Michael
BY
Chapin Haywood & Marble
his ATTORNEYS No. 748,970. PATENTED JAN. 5, 1904.
I. A. MICHAEL.
AUTOMATIC SIGNALING APPARATUS.
APPLICATION FILED JUNE 27, 1902.
NO MODEL. 8 SHEETS—SHEET 7.
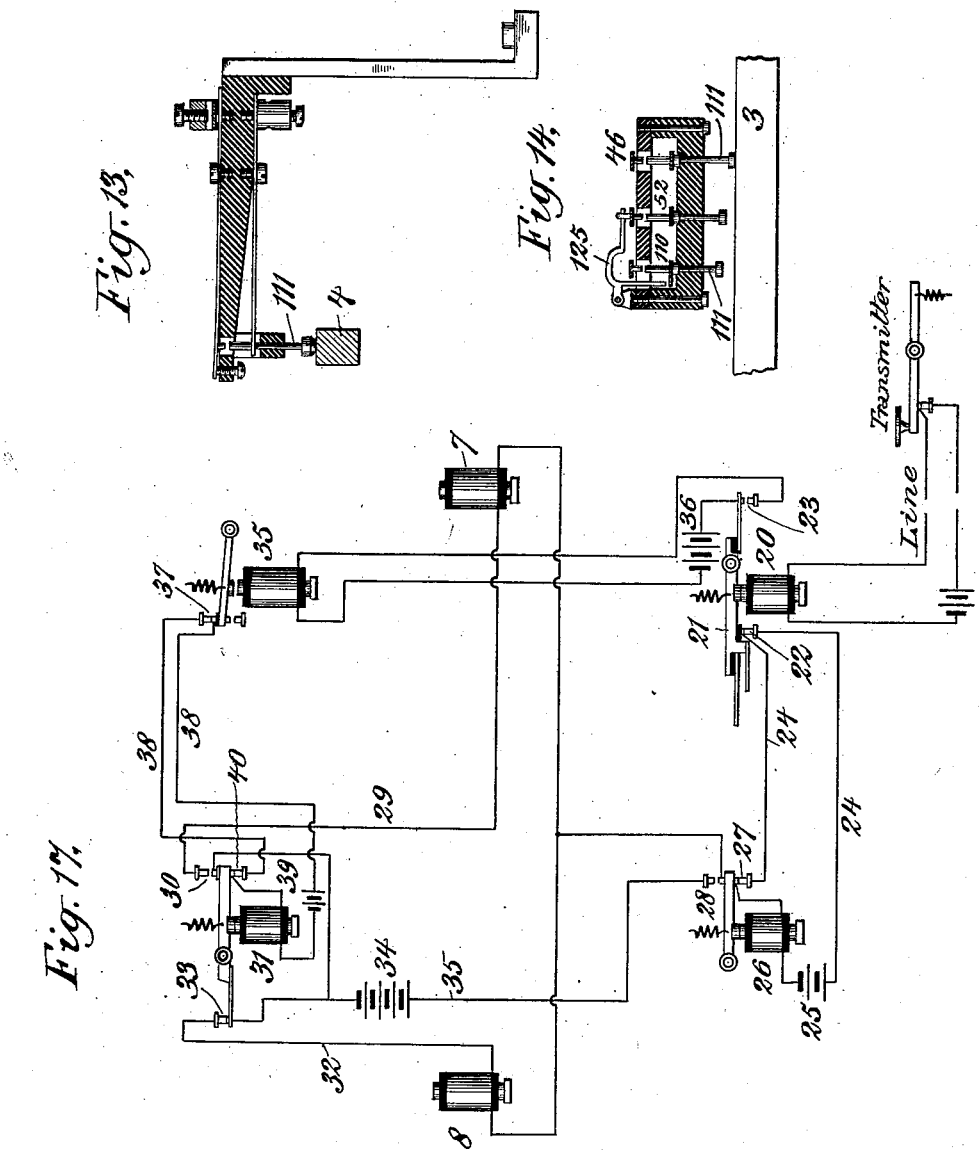
WITNESSES:
INVENTOR
Ira A. Michael
BY
his ATTORNEYS

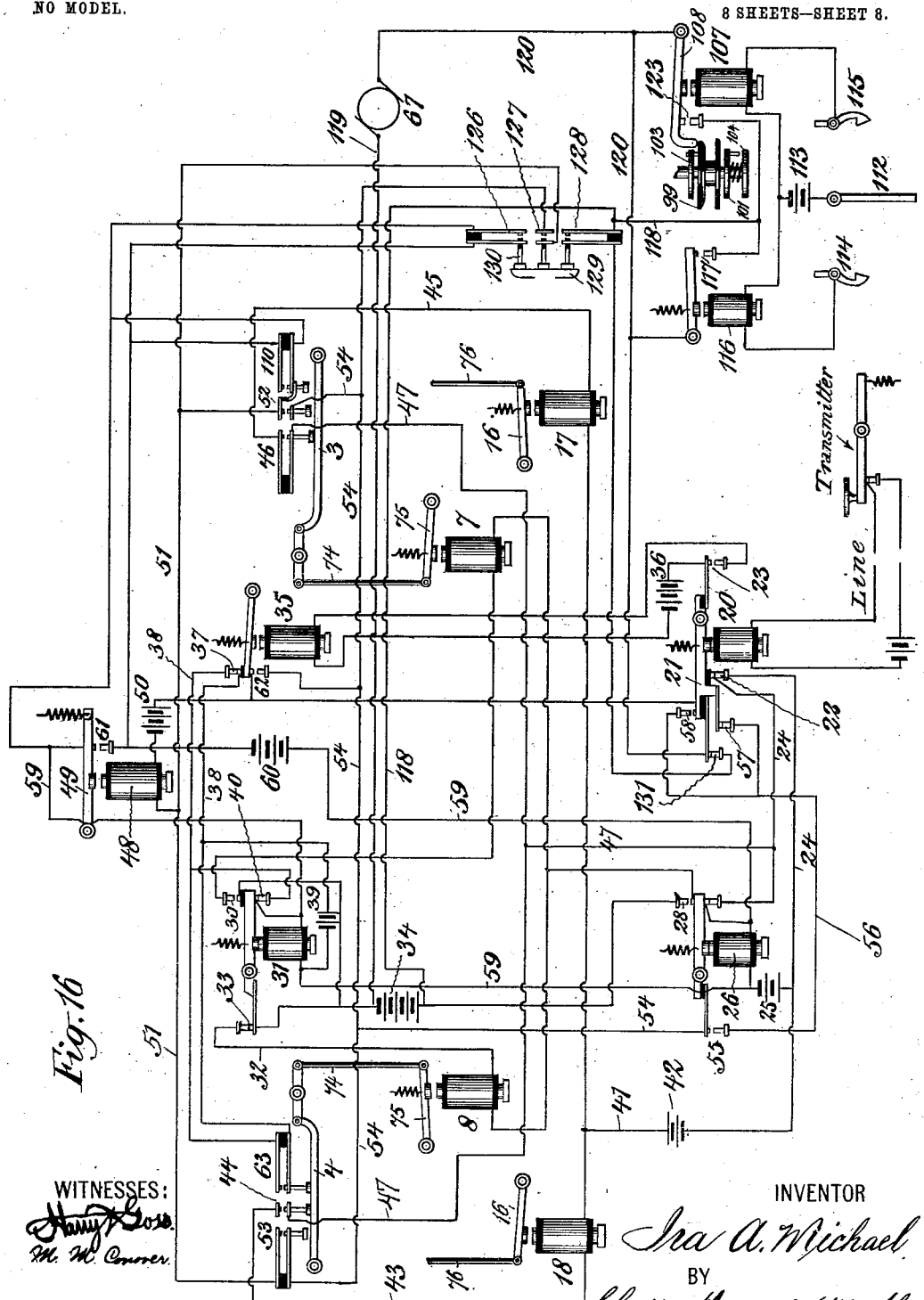

No. 748,970. Patented January 5, 1904.

UNITED STATES PATENT OFFICE.

IRA A. MICHAEL, OF CHICAGO, ILLINOIS, ASSIGNOR OF ONE-HALF TO JOHN H. REYNOLDS, OF TROY, NEW YORK.

AUTOMATIC SIGNALING APPARATUS.

SPECIFICATION forming part of Letters Patent No. 748,970, dated January 5, 1904.

Application filed June 27, 1902. Serial No. 113,444. (No model.)

*To all whom it may concern:*

Be it known that I, IRA A. MICHAEL, a citizen of the United States of America, and a resident of Chicago, Cook county, State of Illinois, have invented certain new and useful Improvements in Automatic Signaling Apparatus, of which the following is a specification, reference being had to the accompanying drawings, forming a part thereof.

My invention relates to automatic signaling apparatus, and particularly to receiving mechanism for telegraph and like electrical signaling systems.

My invention consists in certain improved mechanism whereby current pulses transmitted over a single wire may be received and converted into signals of a readily-recognizable character, such as the letters of the alphabet, &c., and suitably recorded.

In carrying out my invention I employ a primary relay, which by its construction, arrangement, and adjustment is capable of responding differently to current pulses of different strength or duration, a signal member adapted to move in different directions, and operating mechanism for moving the signal member in such different directions under control of the primary relay. I further employ step-by-step mechanism for the signal member, whereby the same is caused to be moved a step at each change of condition in the line-circuit, recording or printing means operated upon a pause in the main-line circuit, and means for restoring the parts to their normal positions at the completion of each signal.

The objects of my invention are to reduce to a minimum the number of pulses necessary for the production and recording of each signal, to reduce as far as possible the number of electrical circuit-closing contact-points employed for the same purpose, to simplify the selective apparatus and render the action of the same positive, to reduce the number of parts employed, and to simplify the construction and arrangement of the mechanism as a whole.

My invention further consists in certain improved construction and combination of parts, as will be more fully pointed out in the following description, and other advantages will appear hereinafter.

I will now proceed to describe an apparatus embodying my invention and the method of employing same, and will then point out the novel features in claims.

In the drawings, Figure 1 is a front view of an apparatus adapted to receive and record signals in accordance with my invention. Fig. 2 is a top view thereof. Fig. 3 is a view in transverse section, the plane of section being taken substantially upon the line 3 3 of Fig. 1. Fig. 4 is a horizontal section of certain parts comprising the escapement and printing-hammer mechanism and certain correlated and coacting parts, the plane of section being taken substantially upon the line 4 4 of Fig. 3. Fig. 5 is a rear view of certain parts, including certain parts of the carriage escapement mechanism and certain parts of the carriage back-spacing mechanism. Fig. 6 is a view in horizonal section taken upon the plane of the line 6 6 of Fig. 1. Fig. 7 is a detail view of certain escapement wheels and pawls employed in connection with the step-by-step movement of the signal member. Fig. 8 is a detail view of a retaining-dog and contact-strip employed. Fig. 9 is a detail view of certain parts of the line-spacing-operating mechanism. Fig. 10 is a detail side view of a clutch employed in connection with the carriage movement, the line-spacing, and the back-spacing operating mechanism. Fig. 11 is a detail view of certain parts employed in connection therewith and with another retaining-dog and contact-strip employed. Fig. 12 is a detail sectional view taken upon the plane of the line 12 12 of Fig. 10. Figs. 13 and 14 are detail views of certain circuit-closers employed. Fig. 15 is a mechanical diagram illustrating the means employed for moving the signal member so as to bring the required signal opposite a predetermined point. Fig. 16 is an electrical diagram illustrating a series of circuits employed in carrying out my invention, and Fig. 17 is a detail view of certain of the circuits illustrated in Fig. 16 separated therefrom.

In carrying out my invention I employ a signal member having a plurality of signals denoted thereon adapted to move in opposite directions, and in connection therewith I employ operating devices for moving the signal member in opposite directions and step-by-step mechanism in connection therewith for controlling the distance that the signal member is permitted to move. In connection with such mechanism I employ electrical devices which control the operation of the operating and step-by-step mechanism to so control the signal member as to bring a required signal opposite a predetermined point in accordance with the character and number of impulses transmitted along a single wire.

In describing my apparatus I will first refer to Fig. 15, which shows in diagram the principle upon which the operating and step-by-step mechanism controlling the signal member works. Reference character 1 designates the signal member rigidly mounted upon a vertical shaft 2. The signal member 1 comprises a central hub, a spoke, and a sector carrying printed type or other signal characters upon its face. Normally the type-sector rests with a blank space upon its face opposite a central point, which is the printing-point. The type-sector is shown in such central position throughout the drawings. The type-sector or signal member is adapted to be moved in one direction or the other from its central intermediate position to bring the various characters upon its face successively opposite the printing-point. For the purpose of so moving the signal member two operating devices are provided, which may comprise levers 3 and 4, having pins 5, adapted to engage a plate 6, rigidly mounted with the signal member and the vertical shaft 2. The operating-levers 3 4 are suitably pivoted and are adapted to be controlled in their movements by electromagnets 7 and 8. In referring hereinafter to these electromagnets 7 and 8 I will refer to them as right and left hand operating-magnets, respectively. For the sake of simplicity in the diagram Fig. 15 I have shown the levers 3 and 4 as separate bars directly carrying the armatures for the electromagnets 7 and 8. In the application of the device to a complete machine these parts are arranged somewhat differently, as will presently be explained, the principle, however, being precisely the same.

The shaft 2 has rigidly secured thereto a mutilated crown bevel gear-wheel 9, and two side shafts 10 10 are suitably mounted in bearings provided therefor and are each provided with bevel gear-wheels 11 11, normally just out of engagement with the gear portion of the wheel 9 and adapted to engage with such gear portion upon an initial movement of the gear in either direction.

The side shafts 10 are each provided with escapement-wheels 12 and 13, engaging escapement-pawls 14, mounted on suitable pivotal supports 15 and connected with the armatures 16 of electromagnets 17 and 18, hereinafter referred to as right and left hand escapement-magnets, respectively. Springs 19 normally tend to hold the escapement-wheels 12 and 13 up to their pawls 14. The teeth of each of the escapement-wheels 12 correspond to the teeth of their respective wheels 13, but alternate in relative position thereto, as is more clearly shown in detail, Fig. 7.

It will be apparent from the foregoing description of the parts that the energization of either the right or left hand operating-magnets 7 or 8 will initially determine in which direction the signal member will move. In fact, it will cause the signal member to move slightly in one direction or the other, such distance being just that required to engage the toothed portion of the wheel 9 with one or other of the bevel-gears 11. The escapement-wheels 12 and 13 will hold the shafts 10 against rotation and prevent the signal member from moving any distance farther than such slight initial movement until a vibration of one of the ratchet-pawls, due to current pulsations in its escapement-magnet, will permit its escapement-wheels 12 13, shaft 10, and bevel gear-wheel 11 to rotate step by step under the influence of the attraction of the operating-magnet at that time applying power. It will be understood that the operating-magnet is arranged to move the levers 3 4 a distance sufficient to turn the signal member from its central position to the limit of its movement in either direction when permitted to do so by the escapement mechanism. Thus energization of either of the operating-magnets 7 or 8, accompanied by successive pulses transmitted to the corresponding escapement-magnet 17 or 18, will bring any desired signal upon the signal member opposite the predetermined point.

I will now refer to Fig. 17, which shows certain parts of the circuits which control the primary relay, the operating-magnets, and certain local relays in connection therewith, and a description of such circuits will show how the operating-magnets 7 or 8 may be controlled to initially select the direction of movement of the signal member in accordance with the character of the current pulse in the line-circuit.

In connection with my improved signal apparatus I have shown as a transmitting instrument a Morse telegraph-key, as the precise form of transmitting instrument forms no part of the present invention and any device for transmitting pulses along the line-circuit may be employed.

20 designates a primary relay directly controlled from the line-circuit, and 21 the armature therefor. The armature 21 controls in its movement contact-points 22 and 23. The normal position of the line-circuit as arranged herein is closed, and hence the normal condition of the coils of the primary relay 20 is energized, and the position of the armature 21 a position attracted toward the coils in which the points 22 are closed and the points 23 are open. The points 22 are in a local circuit 24, including therein a generator 25, the coils of a local relay 26, and points 27, closed by the local relay-armature when attracted toward its electromagnet. The generator 25, in the normal condition of the parts, energizes the coils of the local relay 26 to attract its armature thereto. The armature of the local relay 26 also controls circuit-closing points 28, which, in the normal closed position of the line-circuit, are open. A local circuit passing from one of the points 28 divides into two branches, passing through the coils of the operating-magnets 7 and 8. The branch of magnet 7 passes through a wire 29 to points 30, controlled by relay 31, hereinafter designated as a "switch-relay." The branch of magnet 8 passes through a wire 32 to points 33, also controlled by the said switch-relay. The return-wires from the points 30 and 33 pass in multiple to a local battery 34 and from thence through a wire 35 back to the points 28.

In the diagram shown in Fig. 17 the parts are all shown in their normal rest positions. If a rapid pulse be sent through the main line, a rapid break will be effected in the primary relay 20 and the points 23 will be opened for a brief space of time. This space of time will be so brief that the points 23 will not be closed, or if they are closed they will be closed for such an infinitesimal period of time that they will not operatively affect any instruments controlled by the circuit thereby closed. The breaking of the local circuit in which the points 22 are located will, however, momentarily break circuit through the coils of the local relay 26, and the armature will fly away from its magnet, thereby breaking the points 27, which are also in the said local circuit. The reclosing of the points 22 by the reattraction of the armature 21 will not cause the reënergization of the coils of the local relay 26, because the points 27 will be broken and the local circuit 24 will hence not be reëstablished by the mere closing of the points 22. When the armature of the local relay 26 was released, as just explained, not only were the points 27 broken, but the points 28 were closed. The effect of closing the points 28 was then to close circuit through the left-hand operating-magnet 8, wire 32, points 33, battery 34, back to points 28, and to energize the operating-magnet 8. At such time it will be noted that no current passed through operating-magnet 7, because the circuit therethrough was broken by the fact of the points 30 being open. In this way it will be seen that the left-hand operating-magnet 8 may be operated to the exclusion of the right-hand operating-magnet.

Assuming the parts back again in their normal positions, I will now show how the right-hand operating-magnet 7 may be operated to the exclusion of the left-hand operating-magnet. If the circuit be merely broken in the line and such circuit be held open for a period of time sufficient for good contact to be made by the points 23, the coils of a relay 35, hereinafter referred to as the "shift-relay," will be energized by the closing of a local circuit through a local battery 36 and the armature thereof attracted. The armature of the shift-relay 35 controls points 37, arranged in a local circuit 38, which passes through a local battery 39, the coils of the switch-relay 31, and points 40, controlled by the armature of the shift-relay 31. When the points 37 are broken by the attraction of the armature of the shift-relay toward its coils, the local circuit 38 is broken and the coils of shift-relay 31 are deënergized, permitting the armature thereof to be retracted by a spring to break the points 33 and the points 40 and to close the points 30. With this condition of things the circuit closed by the closing of the points 28 at the time the armature 21 of the primary relay operated to close the points 23, and hence to also open the points 22, will pass through the right-hand operating-magnet 7, the wire 29, points 30, battery 34, wire 35, back to points 28, and will be prevented from passing through the coils of the left-hand operating-magnet 8 because of the breaking of the circuit at the points 33.

It will thus be seen that a change from the normal condition of the line-circuit—as here shown, a change from a condition of closed circuit to a condition of open circuit—will effect the operation of the right-hand operating-magnet 7 and initially determine that the signal member shall move in one direction, while a rapid change from and back to the normal condition of the line-circuit, as a quick make and break therein, will effect the operation of the left-hand operating-magnet 8 and initially determine that the signal member shall move in the other direction.

The direction in which the signal member is to move having been first determined by the character of the initial pulse of any one signal, it is next necessary that the escapement mechanism shall respond to subsequent pulses of the same signal in order that the signal member may be moved the required distance to bring that signal thereon corresponding in the code with the signal transmitted opposite the predetermined point.

The escapement-magnet circuits are shown clearly in the diagrammatic view, Fig. 16, to which reference is now made. The escapement-magnets 17 and 18 are connected together in multiple by branches of a wire 41, which leads from one of the contact-points 22 of the primary relay, thence to a local battery 42, and from said battery to both said escapement-magnets 17 and 18. A return-wire 43 leads from the escapement-magnet 18 to contact-points 44, controlled by the movement of the operating-lever 4 in a manner presently to be described, and a wire 45 leads from the escapement-magnet 17 to contact-points 46, controlled in a similar manner by the lever 3. Branches of a common wire 47 lead back from the points 44 and 46 to the primary relay-points 22.

All parts in Fig. 16 being shown in their normal positions, it will be apparent that though the points 22 are normally closed the normal condition of the escapement-circuits is an open one, the circuit being broken at points 44 and 46, said points being normally out of contact with each other. The contact-points 44 and 46 are constructed and arranged to be closed upon the first movement of their respective operating-levers responding to the initial energization of one or other of the operating-magnets 7 and 8. Such initial energization has been shown, however, to take place upon the movement of the armature of the primary relay away from its coils, and hence escapement-circuit is not yet complete, being at such time open at points 22. The remaking of the line-circuit, whether it be rapidly to effect the operation of the left-hand operating devices or after a slight pause to effect the operation of the right-hand operating devices, in attracting the armature 21 and closing the points 22, will complete the escapement-circuit through either the right or left hand escapement-magnet in accordance with which of points 44 or 46 is closed, and in energizing one or other of the said magnets will cause the signal member to make a movement one step in the initially-selected direction. Subsequent pulsations in the line will cause the continuance of the step-by-step movement of the signal member in the initially-selected direction to bring the desired signal into place.

In the present embodiment of my invention the predetermined position into which it is desired to bring the selected signal is a position in which it may be printed or otherwise recorded. The printing position herein is midway of the signal member when in its normal intermediate rest position, and a hammer located opposite this point is arranged to print or record the signals by striking a blow upon a record-strip of paper or other suitable record-strip interposed between it and the signal member. The hammer-operating mechanism is under the control of suitable electrical means. (Diagrammatically shown in Fig. 16.) Such electrical means comprises an electromagnet 48, having a suitable armature 49. A movement of the said armature will effect a printing operation of the hammer in a manner presently to be explained. The circuit for the hammer-operating magnet 48 comprises a local battery 50, from which a wire leads to the coils of the said magnet, a wire 51 leading from the said coils and having branches connecting in multiple with contact-points 52 and 53, controlled by the operating-levers 3 and 4, respectively, a wire 54, having branches connecting in multiple with the opposite side of contact-points 52 and 53, said wire connecting at its opposite end with contact-points 55, controlled by the armature of the local relay 26, a wire 56 leading from points 55 and having branches connecting in multiple with contact-points 57 and 58, and a wire leading from the opposite side of contact-points 57 and 58 back to the battery 50. The contact-points 52 and 53 are closed by the movement of their respective operating-levers 3 and 4 in the same manner as previously explained for the points 44 and 46, except that while the points 44 and 46 are closed upon the first or initial movement of their respective operating-levers the points 52 or 53 are not closed until the first step-by-step movement is given to the said levers. A single energization of either of the escapement-magnets 17 or 18 after the initial energization of the corresponding operating-magnet will cause one or other of the operating-levers 3 or 4 to move a sufficient distance to close one or other of the sets of contact-points 52 53 to complete the hammer-circuit. It will be remembered that immediately upon an initial pulse being transmitted along the line the circuit holding the armature of the local relay 26 was broken. Therefore contact between points 55, controlled by said local relay-armature, will always have been established prior to the closing of the points 52 or 53. The contact-points 57 and 58, controlled by the primary relay-armature 21, maintain the hammer-circuit closed whenever it shall have been established through the points 52 or 53 for so long a period as the said relay-armature 21 is at rest in either position toward or away from its coils. The tension of the spring of the armature 49, the distance of the said armature away from its coils when in normal rest position, and the electrical resistance in the coils of the hammer-operating magnet 48 are all so arranged as to cause the said hammer-operating magnet to respond but sluggishly to pulses of current supplied thereto, and so long as the armature 21 of the primary relay 20 is kept vibrating without substantial pause sufficient current will not be supplied to the hammer-operating magnet to cause it to operate, owing to the constant breaking of the hammer-circuit at the points 57 and 58. By this arrangement the operating and escapement mechanism may be operated to select the desired signal while the hammer mechanism remains at rest, and then directly the desired signal has been brought opposite the printing-point a pause in the line, while either open or closed, will cause the hammer-operating mechanism to act to print or record the signal. It will be noted that an initial pause in the line for the purpose of selecting the right-hand operating mechanism will not affect the hammer-operating mechanism, because at such time contact-points 52 would still be open and the hammer-circuit would be broken thereat.

The hammer-operating magnet 48 not only effects the operation of the printing-hammer, but also operates to establish a restoring-circuit for the purpose of restoring the parts to their normal positions after the sending and recording of each signal. In order to restore the parts to their normal positions, it is necessary to establish a current momentarily through the switch-relay 31 and through the local relay 26, for it will be remembered that the circuits so far explained for the coils of these relays are holding-circuits merely and passing, as they do, through points opened upon the release of their respective armatures cannot be employed for the purpose of reattracting the armatures once they have been so released.

A restoring-circuit 59 is provided which passes in series through the coils of the switch-relay 31, the coils of the local relay 26, and a local battery 60. The circuit is normally broken at contact-points 61, controlled by the armature 49 of the hammer-operating magnet. Whenever the hammer is caused to operate by the armature 49 being attracted to its magnet, the contact-points 61 will be closed and current will be transmitted along the restoring-circuit to energize the coils of the relays 26 and 31 to reattract their armatures back to their normal positions. If the printing be operated upon closed circuit in the line, and hence during normal position of the armature 21 of the primary relay, the said armatures once reattracted will be retained in such positions by their holding-circuits 24 and 38, respectively, and the breaking of the restoring-circuit at the points 61 upon the return movement of the armature 49 of the hammer-operating magnet will not affect the parts. The hammer-operating magnet and its armature hence constitute a restoring-relay.

For such times as the printing is operated upon open circuit in the line, and hence while the armature 21 of the primary relay is in its released position and the holding-circuit 24 broken at the points 22, I have provided a short circuit adapted to be closed by contact-points 62, controlled by the armature of the shift-relay 35, which will maintain current through the coils of the hammer-operating magnet 48 for so long a time as the line-circuit shall be held open. The contact-points 62 will necessarily be held closed at such times, for during a pause on open circuit in the line the points 23 of the primary relay will be closed and the armature of the shift-relay attracted toward its coils. The short circuit closed by the contact-points 62 passes directly through either the points 52 or 53, as the case may be, and through the battery 50 and hammer-operating magnet-coils independently of the points 55 and the points 57 or 58, through which the circuit is adapted to connect at other times.

When the armature of the local relay 26 is restored to its normal position, the opening of the contact-points 28 will cause the deënergization of the coils of the operating-magnet which had just been active, causing the operating-lever controlled thereby to return to its normal position under the influence of its retractile spring, and thus also to return the signal member to its normal intermediate position.

It will be understood that should printing be effected on open circuit in the line it is necessary to close the line-circuit thereafter before commencing another signal.

It will be noted that the normal position of the switch-relay 31 is with its armature attracted toward its magnet and with the contact-points 33 closed and the contact-points 30 open. In transmitting a signal employing the left-hand operating-magnet 8—that is, one commencing with a quick break and make in the line-circuit—the condition of the switch-relay remains unchanged, while if a signal be transmitted which employs the right-hand operating-magnet 7 or one commencing with a break and then a pause in the line-circuit the position of the switch-relay armature is reversed during the sending of the signal, but is always restored at the conclusion thereof, even though the succeeding signal be of a similar character. When a signal of the first-mentioned character is transmitted and the printing or recording thereof effected during a condition of open circuit in the line, it is necessary to provide some means other than the contact-points 37 for keeping the retaining-circuit 38 of the switch-relay coils closed, because during the pause necessary for printing upon open circuit in the line the coils of the shift-relay 35 will be energized and will attract its armature, thereby opening the contact-points 37. I have therefore provided an additional set of contact-points 63 in multiple with the contact-points 37 and have arranged to operate them by movements of the operating-lever 4 at the same moment that the contact-points 44 in the left-hand escapement-circuit are operated. Thus upon operating upon the left-hand side the opening of the points 37 after the initial energization of the operating-magnet 8 will have no effect upon the switch-relay.

I will now describe an apparatus suitable for receiving and printing signals transmitted in the foregoing manner and for such purpose refer more particularly to the first six figures of the drawings. The apparatus has a frame comprising a base-plate 64, a table 65, and posts 66, supporting the table 65 upon the base-plate 64. The relays and the various operating-electromagnets are for convenience all arranged upon the base-plate 64, while the printing or recording mechanism and a motor 67, for a purpose presently to be described, are arranged upon the table 65.

In general, the type-sector and its mounting, the paper-carriage and its escapement mechanism for word and letter spacing, the line-spacing mechanism, the back-spacing mechanism, the printing mechanism, and the ink-ribbon mechanism are all similar to that of the well-known Hammond type-writing machine, such as is shown and described in United States Patent to J. B. Hammond, No.

290,419, dated December 18, 1883, from which I have adapted them for my present purposes.

In the following I will describe in general the mechanism in so far as it follows the mechanism of the well-known type-writing machine referred to and specifically in detail such changes as I have made in order to adapt the same for my purposes.

The signal member 1, described and shown in Fig. 15 for the sake of simplicity as a single unitary piece, is in this practical form of my apparatus formed in two parts, comprising a type-sector 68 and a carrier 69. The carrier 69 is fast to a sleeve-shaft 2, mounted upon a stationary axle, as is also the mutilated crown gear-wheel 9 and the operating-plate 6. The type-sector 68 is mounted and slides in a slot in a stationary portion of the framework of the machine. The operating-levers 3 and 4 are pivotally mounted upon a stationary horizontal shaft 70. These levers, which in the diagram Fig. 15 were shown for the sake of simplicity and clearness as simple straight levers and constituted also the armature-levers for the operating-magnets 7 and 8, are here shown as independent bell-crank levers, their upper arms carrying the pins 5 for engaging the operating-plate 6 and their lower spring-actuated arms extending at substantially right angles to their upper ones and connecting by a short link 71 to one arm each of short levers 72. The opposite ends of the short levers are forked and engage pins upon levers 73, suitably fulcrumed upon the frame and connected by links 74 with the armatures 75 of the operating-magnets 7 and 8, respectively.

The escapement-magnets 17 and 18 are arranged upon the base-plate 64 at opposite sides of the operating-magnets 7 and 8, and the escapement mechanism, comprising the side shafts 10, the bevel gear-wheels 11, the escape-wheels 12 and 13, the escapement-pawls 14, the armature-levers 16, and the springs 19, is arranged almost precisely as illustrated and described in connection with the diagram Fig. 15. The escapement-pawls 14 are pivoted at 15 to stationary portions of the frame and are connected to the armature-levers 16 by means of links 76, which engage studs 77, extending laterally from the pawls 14. The studs 77 also form pivotal supports for the portions 78 of the pawls which engage the escape-wheels 12 and 13, so that such portions may give freely during a reverse movement of the escape-wheels 12 and 13 to permit the signal member to return to its normal intermediate position after each signal has been completed.

The escapement mechanism controlled by each of the escapement-magnets 17 and 18 comprises two members 12 and 13, having corresponding teeth arranged alternately or in staggered relation to each other, as will be clearly understood by reference to Figs. 1, 2, 7, and 15 of the drawings, so that a step-by-step movement may be imparted to the signal member upon each movement of the escapement-pawl in either direction, and hence a step-by-step movement at each change of condition in the line-circuit. For instance, assuming the portion 78 of the pawls to be normally in engagement with the teeth of the members 12 of the escapement-wheels 12 13 and their respective magnets 17 and 18 being deënergized, upon energization of either one of the said magnets the pawl operated thereby will pass from the tooth of its escapement-wheel 12 to the next succeeding tooth of its escapement-wheel 13 and upon deënergization will then pass back again to the next succeeding tooth upon the wheel 12, thus permitting two movements of the escapement mechanism for each complete reciprocation of a pawl.

The hammer or printing mechanism comprises the ordinary printing-hammer 79, common to a Hammond type-writing machine, pivoted at 80 to the framework of the machine and having a spring 81 (see more particularly Fig. 3) for rocking it upon its support and forcing its printing-face toward the face of the type-sector 68. A yoke 82, loosely mounted upon a stub-shaft 83, engages at one end a pin 84, projecting rearwardly from the hammer 79. The yoke 82 carries a pawl 85, which engages the teeth of a ratchet-wheel 86, rigidly secured upon the stub-shaft 83. The stub-shaft also carries rigidly secured therewith a pinion 87, which is in mesh with the teeth of the rack-bar 88 of the paper-carriage. The paper-carriage has a constant tension applied thereto to move it in the direction of the arrow, Fig. 5, as by means of the tension-drum 132 in a manner well known. The tension of the carriage operating through the stub-shaft 83 and the ratchet-wheel 86 tends to hold the printing-hammer 79 away from the face of the type-sector 68. An operating-detent 90 is employed, which engages the pawl 85 in the manner shown in Fig. 5 of the drawings and which when operated causes the pawl 85 to disengage the tooth of the ratchet-wheel 86 with which it is at the time engaged to free the yoke 82 and to permit the printing-hammer to fly forward under the tension of its spring to print a signal character of the type-sector 68. The pawl 85 in such movement engages the next succeeding tooth of the ratchet-wheel. When the detent 90 is so operated, a projection 91 thereon engages the ratchet-wheel 86 and holds the paper-carriage against movement. The pawl 85 has during this time engaged the next succeeding tooth of the ratchet-wheel 86, and upon a return movement of the detent 90 to its normal position the paper-carriage 89, owing to the greater tension of its spring than that of the hammer-spring 81, is permitted to feed forward a space equal to the distance between the two teeth of the ratchet-wheel 86, while because of the engagement of the pawl 85 with the ratchet-wheel 86 the yoke 82 is rocked upon its support until stopped by the engagement of a portion thereof with a portion of the frame, as shown, and the printing-hammer 79 returned to its normal "out-of-operation" position.

In order to operate the printing-hammer at the desired moment under influence of the hammer-operating electromagnet 48, I have connected the detent 90 with the armature 49 of the said electromagnet by a link, and I have interposed a light spring 93 between the link 92 and the said armature 49 in order to give flexibility to the connection. Suitable inking mechanism may also be provided and operated in any desired manner. I have also shown a suitable back-spacing device in a lever 94, a bevel crank-lever 95, and an operating-dog 96, adapted and arranged upon each reciprocation of the lever 94 to set the carriage 89 back against the tension of its spring one space.

97 is a line-spacing operating-lever. (See more particularly Fig. 1.) It is unnecessary herein to describe in detail the precise mechanism controlled by this line-spacing lever, as the same forms no part of this my present invention. Suffice to say that a reciprocation thereof effects the line-spacing of the paper-carrying roller and the consequent shifting of the paper longitudinally when desired. A flexible cord or chain 98 is secured at one end to the said line-spacing lever and at the other end is secured to a pulley or winding-drum 99, mounted on the armature-shaft of the motor 67. The pulley or winding-drum 99 is normally secured to rotate with the said armature-shaft, but may be released therefrom by suitable clutch mechanism when so desired. When current is supplied to the motor to operate same, tension is applied to the cord 98 to return the paper-carriage after the completion of a line of printing or at any other time, as may be desired, and the tension applied to pull the carriage over against the resistance of its spring will be sufficient to cause the rocking of the line-spacing lever 97 upon its support to effect a movement of the paper to line-space same. A suitable take-up device 100 is provided in order to take any slack in the cord 98.

The armature-shaft of the motor 67 has another pulley or winding-disk, 101, loosely mounted thereon, and a cord 102 is connected therewith and with the back-spacing lever 94. The pulley or winding-drum 99 and the pulley or winding-disk 101 are both of them loosely mounted upon the armature-shaft of the motor 67. Fastened to the said armature-shaft are two collars 103 104, having a plurality of orifices therein, as shown more particularly in Fig. 12, and the pulleys 99 and 101 are each provided with pins 105, adapted to engage with the holes in the collars 103 104, respectively. A spring 106 normally presses the pulleys 99 and 101 inwardly toward the motor, causing the disengagement of the pulley 101 with its collar 104 and the engagement of the pulley 99 with its collar 103. In such position the pulley 99 is secured to rotate with the armature-shaft, while the pulley 101 is free therefrom. An electric magnet 107 is provided having an armature-lever 108, carrying at its upper end a fork 109, which engages the inner face of the pulley 99. When the coils 107 are deënergized, the parts remain in the position just described and in which position they are illustrated in Fig. 10 of the drawings. When the coils 107 are energized and the armature-lever 108 attracted thereto, the pulley 99 is disengaged from its collar 103, while the pulley 101 is engaged with its collar 104. If power be applied to the motor when the parts are in such positions, tension will be applied to the cord 102 to operate the back-spacing lever, while the cord 98, connecting with the carriage, will be left free. When circuit is broken through the coils 107, the spring 106 will return the parts to their normal position.

The spring contact-points 53, 44, and 63 on the left-hand side of the machine and 46 52 and another set of contact-points 110, for a purpose to be presently described, upon the right-hand side of the machine, are operated by the levers 4 and 3, respectively. Studs or pins 111 are arranged between the said operating-levers and the lower set of contact points or fingers and by varying the length of the studs or pins 111, as shown particularly in detail Fig. 14, the various pairs of contact-fingers are arranged to close at different points in the movement of the operating-levers for the purposes previously described. By referring to Fig. 13 it will be further seen that although a slight movement of the operating-lever 4 will cause the contact-fingers there shown to engage subsequent movements of the operating-lever will be permitted by the fact that provision is made for each pair of spring-tongues to move upwardly together after contact has been made.

I will now proceed to describe the circuits in connection with the motor 67 and the means for controlling and operating same. The carrier 69 of the signal member 1 is provided at its outer end with a contact-finger 112, such contact-finger connected through a suitable connecting-wire with a local battery 113, as shown in diagram Fig. 16. As shown more particularly in Fig. 3, the contact-finger 112 is suitably insulated from the carrier 69. Contact-strips and retaining-dogs 114 and 115, spring-actuated in one direction, (see more particularly Figs. 2, 8, and 11,) are pivotally mounted upon opposite sides of the center of rotation of the signal member and in the line of movement of the contact-finger 112. After the signal member has been moved through an arc sufficient to bring all of its signals successively on one side or the other opposite the printing-point it is arranged to have a still further movement which will cause the engagement of the contact-finger 112 with the contact-strip 114 or 115 in accordance with which direction it is moved. In the present arrangement when it is desired to return the carriage to a position on the right-hand side of the machine and to line-space the contact-finger 112 is caused to engage with the contact-strip 114. The contact-strip being arranged in the form of a latch acts also as a retaining-dog and retains the contact-finger when once engaged therewith until released therefrom mechanically. When contact is made between contact-finger 112 and contact-strip 114, a local circuit is closed through a local battery 113 and the coils of a relay 116. This will cause the attraction of its armature, closing points 117, controlled thereby, and completing circuit through the motor 67. This circuit passes from points 117 through a wire 118 to the generator or battery 34, through a wire 119 to the motor 67, through a wire 120 back from the motor 67 to the points 117. When the carriage 89 has traveled the limit of its movement toward the right-hand side, a portion 121 thereof will strike an extension 122 of the retaining-dog 114 (see particularly Figs. 2 and 8) and will rock the retaining-dog upon its pivotal support, thereby releasing the contact-finger 112 and permitting the signal member to return to its normal intermediate position. Just prior to the movement of the carriage and upon a pause in the line-circuit after the escapement mechanism has caused the contact-finger 112 to reach the limit of its movement, so as to engage the contact-strip 114, the hammer mechanism will be brought into action as usual; but the type-sector is arranged to have no signal opposite the printing position of this point, and therefore no signal will be printed or recorded. The movement of the armature 49, however, will operate to close the restoring-circuit to return the parts to their normal position, as before. The contact-strip and retaining-dog 114 is spring actuated to return to its normal position after the release thereof by the first movement of the carriage to the left.

When it is desired to back-space the carriage but a single step at a time, a signal will be transmitted over the line which will cause the contact-finger 112 to engage the contact-strip and retaining-dog 115. This will cause a local circuit to be established through the local battery 113 and the coils 107, operating the motor-clutch. When local circuit is so established and the coils 107 energized, contact-points 123 will be closed and circuit will be established through wire 118, battery 34, wire 119, motor 67, and wire 120 in the same manner as previously explained in connection with points 117 of relay 116. Prior to the establishing of the motor-circuit, however, the motor-clutch was operated and the pulley 101, connecting with the back-spacing operating-lever 94, was secured to the motor armature-shaft, and the pulley 99, connecting with the carriage, was released therefrom. Operation of the motor will hence cause a movement of the back-spacing lever to back-space the carriage one step. A cord or link 124 connects the back-spacing lever 94 with the contact-strip and retaining-dog 115, so that when the said lever is operated the contact-finger 112 will be released and the signal member permitted to return to its normal intermediate position. In back-spacing it is essential that the hammer mechanism should not work, because the operation of the hammer mechanically works the carriage-escapement and permits the carriage to move forward one step. If, therefore, the hammer mechanism were permitted to work, the carriage would be permitted to move forward one space each time it was moved backward a space, and the result would be no effective movement at all. I have therefore provided means for mechanically opening the hammer-circuit at the hammer-contact points 52, controlled by the operating-lever 3, whenever the signal member is moved around such a distance as to cause the contact-finger 112 to engage the contact-strip 115. I have then utilized the extra pair of contact-points 110 for the purpose of establishing the restoring-circuit 59 at such time in order to restore the parts to their normal position. In other words, the restoring-circuit will be closed, while the hammer mechanism will be cut out.

Referring for a moment to Fig. 14, it will be seen that that stud or pin 111 which causes the contact-points 110 to engage is shorter than any of the other such studs or pins and, in fact, is arranged only to cause the contact-points 110 to engage at such time as the contact-finger 112 is moved clear around to engage the contact-strip and retaining-dog 115 and to be retained thereby. I have further provided a lever 125, which just before the signal member reaches the limit of its movement to cause its contact-finger 112 to engage the contact-strip 115 is arranged to break contact between the contact-points 52 by raising the upper contact-strip away from engagement with the lower. By this means I have arranged at the right moment to close the restoring-circuit, but to throw the hammer-operating mechanism out of operation. In the return movement of the signal member the points 110 and 52 will be permitted to return to their normal positions. By this arrangement a single back-space may be effected by a signal causing the contact-finger 112 to engage the contact-strip 115, and successive similar movements may be made by similar successive signals sent over the line, it being understood that the contact-finger 112 and signal member to which it is attached will return to its normal position after each such signal.

In order to work the paper out of the machine, it is necessary to operate the line-spacing device successively, while the carriage is held stationary. To accomplish this, a signal is first transmitted, which will cause the carriage to move over to the extreme right. It will be recalled that in such movement the dog 114 is tripped and the signal member permitted to return to its normal intermediate position. At the right-hand side I have provided three sets of spring contact-points, (designated, respectively, by the reference characters 126, 127, and 128.) When the carriage reaches the limit of its movement toward the right-hand side, a portion 129 thereof will engage studs or pins 130, similar to the studs or pins 111, and will close the said contact-points. The contact-points 126 when closed will establish the restoring-circuit and will hold the armatures of the switch-relay 31 and the local relay 26 attracted toward their coils, so that none of the parts affected by the movement of these relays will be operated. Operation of the primary relay will then not affect the signal member at all, but vibration of the armature 21 thereof will open and close a pair of contact-points 131, with which the said relay is provided. When these contact-points are closed, the contact-points 128, being also closed, due to the position of the carriage at the extreme right, circuit will be established through the motor 67. Each vibration of the armature 21 of the primary relay 20 will then open and close circuit through the motor 67 to cause same to give a series of pulls upon the cord 98. The cord 98 being connected to the line-spacing lever 97 and the carriage being already over to the right as far as it is possible for it to travel, and hence stationary, the line-spacing lever will be successively operated to cause the paper to move longitudinally out of the machine. The third set of contact-points 127 closed by the carriage in its extreme right-hand movement, are arranged in the hammer-circuit, one of the points connecting with the wire 54 and the other with the wire 51. They are in multiple with the hammer contact-points 52 and 53, both open, since at such time the signal member is at rest in its normal intermediate position. Rapid vibrations of the armature 21 of the primary relay 20 will fail to close the points 23 or to hold them closed sufficiently to cause the shift-relay 35 to bring the hammer mechanism into operation through the closing of points 62 until a pause is made on open circuit in the line. At such time the coils of the shift-relay 35 will be duly energized consequent upon the holding closed of the points 23 of the primary relay, and the hammer mechanism will then be caused to operate. Upon such pause in the line after the paper has been moved longitudinally the required distance the hammer-magnet 48 will be caused to operate and in its operation will effect the operation of the carriage-escapement mechanism, so as to cause the carriage to move one step toward the left, thereby opening contact-points 126, 127, and 128.

Thus to work the paper out of the machine or to move the paper longitudinally to any desired extent it is first necessary to transmit the signal over the line, which will cause the contact-finger 112 to engage the contact-strip 114. The carriage will then be moved to its extreme right-hand position, and subsequent rapid pulses will cause successive operations of the line-spacing mechanism until a pause on open circuit causes the carriage to move one space to the left and opens the contact-points 126, 127, and 128 to cause the receiving mechanism to respond to signals of the code, as formerly.

In the former description of the means employed for retaining the carriage and for line-spacing it was explained that a signal transmitted over the line to cause the contact-finger 112 to engage with the contact-strip and retaining-dog 114 would operate such circuits as pull the carriage clear over to the right, and that during such operation the hammer-circuit would be closed, thereby closing the restoring-circuit and permitting the signal member to return to its normal intermediate position when released by the tripping of the retaining-dog 114 in the final movement of the carriage. By reason of the fact that the carriage in its extreme movement toward the right will close the contact-points 126, 127, and 128 it will be apparent that it will be necessary to cause the carriage to advance one step toward the left to open such points before further signals can be received and recorded in the instrument. For this purpose it will be necessary at the commencement of each new line of printing or recording to open the line circuit for a period of time sufficient to close the points 23 to operate the shift-relay 35 to close the points 62 to operate the hammer-operating magnet 48. This will cause the hammer to strike a blow; but the signal member being in an intermediate position no signal will be recorded. The carriage-escapement mechanism, however, will be operated mechanically to move the carriage one step to the left, thereby disengaging same from the contact-points 126, 127, and 128 and breaking circuits therethrough.

In the arrangement herein shown the primary relay 20 is arranged in a normally closed circuit which is broken and remade by the operation of the transmitter, the current pulse thus produced in the line being, in fact, a pulsatory break, which may be considered to be a current pulse of negative character, (using the expression "negative" in an algebraic sense.) It will be obvious that the relay 20 may be equally operated upon a normally open line instead of a normally closed line without the exercise of invention. It will also be obvious that any variety of current pulses or changes of a pulsatory nature of whatever character which will cause the apparatus to operate in the manner above described may be employed. It will also be obvious that the effects above described consequent upon variation in duration of the current pulses may be obtained by correspondingly varying the intensity of such pulses. Indeed in lines having considerable static capacity the current in the line during a brief pulse never rises to full strength, and therefore the normal operation of my apparatus, as above described, is due as truly to variation in intensity of current strength as it is to variation in duration of the pulse. Hence varying the strength of the pulses and varying the duration of the pulses may be considered herein to be equivalent.

It will be seen that since my invention does not inherently require the primary relay 20 to be a polar relay a number of my instruments may be operated duplex, diplex, or quadruplex over a single line-wire by employing well-known principles of telegraphy.

What I claim is—

1. In electrical signaling apparatus, the combination with a signal member adapted to move in opposite directions, of means controlled by the duration of a current pulse in the line-circuit for initially determining in which direction the signal member shall move, and step-by-step mechanism controlled thereby, arranged to continue movement of said signal member in such predetermined direction only, upon each pulsation in the line-circuit.

2. In electrical signaling apparatus, the combination with a signal member adapted to move in opposite directions, of means controlled by the duration of a current pulse in the line-circuit for initially determining in which direction the signal member shall move, said means comprising two operating devices, one affected by relatively short pulses and the other by relatively longer pulses; and step-by-step mechanism controlled thereby, arranged to continue movement of said signal member in such predetermined direction only, upon each pulsation in the line-circuit.

3. In electrical signaling apparatus, the combination with a signal member adapted to move in opposite directions, of means controlled by the duration of a current pulse in the line-circuit for initially determining in which direction the signal member shall move, and step-by-step mechanism controlled thereby, arranged to continue movement of said signal member in such predetermined direction only, upon pulsations in the line-circuit, irrespective of their duration.

4. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon each pulsation in the line-circuit, and means for recording the signal thus selected.

5. In electrical signaling apparatus, the combination with a signal member adapted to move in opposite directions, of means controlled by the duration of a current pulse in the line-circuit for initially determining in which direction the signal member shall move, said means comprising two operating devices, one affected by relatively short pulses and the other by relatively longer pulses; step-by-step mechanism controlled thereby, arranged to continue movement of said signal member in such predetermined direction only, upon each pulsation in the line-circuit, and means for recording the signal thus selected.

6. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon pulsations in the line-circuit, irrespective of their duration, and means for recording the signal thus selected.

7. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon each pulsation in the line-circuit, and means operated by a pulse of a third character in the main-line circuit for recording the signal.

8. In electrical signaling apparatus, the combination with a signal member adapted to move in opposite directions, of means controlled by the duration of a current pulse in the line-circuit for initially determining in which direction the signal member shall move, said means comprising two operating devices, one affected by relatively short pulses and the other by relatively longer pulses; step-by-step mechanism controlled thereby, arranged to continue movement of said signal member in such predetermined direction only, upon each pulsation in the line-circuit, and means operated by a pulse of a third character in the main-line circuit for recording the signal.

9. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon pulsations in the line-circuit, irrespective of their duration, and means operated by a pulse of a third character in the main-line circuit for recording the signal.

10. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon each pulsation in the line-circuit, and means operated upon a pause in the main-line circuit for recording the signal.

11. In electrical signaling apparatus, the combination with a signal member adapted to move in opposite directions, of means controlled by the duration of a current pulse in the line-circuit for initially determining in which direction the signal member shall move, said means comprising two operating devices, one affected by relatively short pulses and the other by relatively longer pulses; step-by-step mechanism controlled thereby, arranged to continue movement of said signal member in such predetermined direction only, upon each pulsation in the line-circuit, and means operated upon a pause in the main-line circuit for recording the signal.

12. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon pulsations in the line-circuit, irrespective of their duration, and means operated upon a pause in the main-line circuit for recording the signal.

13. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon each pulsation in the line-circuit, and means operated upon a pause in the main-line circuit, while either open or closed, for recording the signal.

14. In electrical signaling apparatus, the combination with a signal member adapted to move in opposite directions, of means controlled by the duration of a current pulse in the line-circuit for initially determining in which direction the signal member shall move, said means comprising two operating devices, one affected by relatively short pulses and the other by relatively longer pulses; step-by-step mechanism controlled thereby, arranged to continue movement of said signal member in such predetermined direction only, upon each pulsation in the line-circuit, and means operated upon a pause in the main-line circuit, while either open or closed, for recording the signal.

15. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon pulsations in the line-circuit, irrespective of their duration, and means operated upon a pause in the main-line circuit, while either open or closed, for recording the signal.

16. In electrical signaling apparatus, the combination with a signal member adapted to move in opposite directions, of means controlled by the duration of a current pulse in the line-circuit for initially moving the signal member in one direction or the other, and step-by-step mechanism controlled thereby, arranged to continue movement of said signal member in the direction in which it has been moved only, upon each pulsation in the line-circuit.

17. In electrical signaling apparatus, the combination with a signal member adapted to move in opposite directions, of means controlled by the duration of a current pulse in the line-circuit for initially moving the signal member in one direction or the other, said means comprising two operating devices, one affected by relatively short pulses and the other by relatively longer pulses; and step-by-step mechanism controlled thereby, arranged to continue movement of said signal member in the direction in which it has been moved only, upon each pulsation in the line-circuit.

18. In electrical signaling apparatus, the combination with a signal member adapted to move in opposite directions, of means controlled by the duration of a current pulse in the line-circuit for initially moving the signal member in one direction or the other, and step-by-step mechanism controlled thereby, arranged to continue movement of said signal member in the direction in which it has been moved only, upon pulsations in the line-circuit, irrespective of their duration.

19. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon each pulsation in the line-circuit, and means for recording the signal thus selected.

20. In electrical signaling apparatus, the combination with a signal member adapted to move in opposite directions, of means controlled by the duration of a current pulse in the line-circuit for initially moving the signal member in one direction or the other, said means comprising two operating devices, one affected by relatively short pulses and the other by relatively longer pulses; step-by-step mechanism controlled thereby, arranged to continue movement of said signal member in the direction in which it has been moved only, upon each pulsation in the line-circuit, and means for recording the signal thus selected.

21. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon pulsations in the line-circuit, irrespective of their duration, and means for recording the signal thus selected.

22. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon each pulsation in the line-circuit, and means operated by a pulse of a third character in the main-line circuit for recording the signal.

23. In electrical signaling apparatus, the combination with a signal member adapted to move in opposite directions, of means controlled by the duration of a current pulse in the line-circuit for initially moving the signal member in one direction or the other, said means comprising two operating devices, one affected by relatively short pulses and the other by relatively longer pulses; step-by-step mechanism controlled thereby, arranged to continue movement of said signal member in the direction in which it has been moved only, upon each pulsation in the line-circuit, and means operated by a pulse of a third character in the main-line circuit for recording the signal.

24. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon pulsations in the line-circuit, irrespective of their duration, and means operated by a pulse of a third character in the main-line circuit for recording the signal.

25. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon each pulsation in the line-circuit, and means operated upon a pause in the main-line circuit for recording the signal.

26. In electrical signaling apparatus, the combination with a signal member adapted to move in opposite directions, of means controlled by the duration of a current pulse in the line-circuit for initially moving the signal member in one direction or the other, said means comprising two operating devices, one affected by relatively short pulses and the other by relatively longer pulses; step-by-step mechanism controlled thereby, arranged to continue movement of said signal member in the direction in which it has been moved only, upon each pulsation in the line-circuit, and means operated upon a pause in the main-line circuit for recording the signal.

27. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon pulsations in the line-circuit, irrespective of their duration, and means operated upon a pause in the main-line circuit for recording the signal.

28. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon each pulsation in the line-circuit, and means operated upon a pause in the main-line circuit, while either open or closed, for recording the signal.

29. In electrical signaling apparatus, the combination with a signal member adapted to move in opposite directions, of means controlled by the duration of a current pulse in the line-circuit for initially moving the signal member in one direction or the other, said means comprising two operating devices, one affected by relatively short pulses and the other by relatively longer pulses; step-by-step mechanism controlled thereby, arranged to continue movement of said signal member in the direction in which it has been moved only, upon each pulsation in the line-circuit, and means operated upon a pause in the main-line circuit, while either open or closed, for recording the signal.

30. In electrical signaling apparatus, the combination with a signal member adapted to move in opposite directions, of means controlled by the duration of a current pulse in the line-circuit for initially moving the signal member in one direction or the other, step-by-step mechanism controlled thereby, arranged to continue movement of said signal member in the direction in which it has been moved only, upon pulsations in the line-circuit, irrespective of their duration, and means operated upon a pause in the main-line circuit, while either open or closed, for recording the signal.

31. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, and step-by-step mechanism controlled thereby, arranged to continue movement of said signal member in the predetermined direction only, upon each pulsation in the line-circuit.

32. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, said means comprising two operating devices, one affected by relatively short pulses and the other by relatively longer pulses; and step-by-step mechanism controlled thereby, arranged to continue movement of said signal member in the predetermined direction only, upon each pulsation in the line-circuit.

33. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, and step-by-step mechanism controlled thereby, arranged to continue movement of said signal member in the predetermined direction only, upon pulsations in the line-circuit, irrespective of their duration.

34. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon each pulsation in the line-circuit, and means for recording the signal thus selected.

35. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means for recording the signal thus selected.

36. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon pulsations in the line-circuit, irrespective of their duration, and means for recording the signal thus selected.

37. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon each pulsation in the line-circuit, and means operated by a pulse of a third character in the main-line circuit for recording the signal.

38. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means operated by a pulse of a third character in the main-line circuit for recording the signal.

39. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon pulsations in the line-circuit, irrespective of their duration, and means operated by a pulse of a third character in the main-line circuit for recording the signal.

40. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon each pulsation in the line-circuit, and means operated upon a pause in the main-line circuit for recording the signal.

41. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means operated upon a pause in the main-line circuit for recording the signal.

42. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon pulsations in the line-circuit, irrespective of their duration, and means operated upon a pause in the main-line circuit for recording the signal.

43. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon each pulsation in the line-circuit, and means operated upon a pause in the main-line circuit, while either open or closed, for recording the signal.

44. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means operated upon a pause in the main-line circuit, while either open or closed, for recording the signal.

45. In electrical signaling apparatus, the combination with a signal member adapted to move in opposite directions, of means controlled by a change from the normal condition of the line-circuit for initially determining that the signal member shall move in one direction, and by a rapid change from, and back to, the normal condition in the line-circuit for initially determining that the signal member shall move in the other direction, step-by-step mechanism controlled thereby, arranged to continue movement of said signal member in the predetermined direction only, upon pulsations in the line-circuit, irrespective of their duration, and means operated upon a pause in the main-line circuit, while either open or closed, for recording the signal.

46. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, and step-by-step mechanism controlled thereby, arranged to continue movement of said signal member in the predetermined direction only, upon each pulsation in the line-circuit.

47. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, said means comprising two operating devices, one affected by relatively short pulses and the other by relatively longer pulses; and step-by-step mechanism controlled thereby, arranged to continue movement of said signal member in the predetermined direction only, upon each pulsation in the line-circuit.

48. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, and step-by-step mechanism controlled thereby, arranged to continue movement of said signal member in the predetermined direction only, upon pulsations in the line-circuit, irrespective of their duration.

49. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon each pulsation in the line-circuit, and means for recording the signal thus selected.

50. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means for recording the signal thus selected.

51. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon pulsations in the line-circuit, irrespective of their duration, and means for recording the signal thus selected.

52. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon each pulsation in the line-circuit, and means operated by a pulse of a third character in the main-line circuit for recording the signal.

53. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means operated by a pulse of a third character in the main-line circuit for recording the signal.

54. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon pulsations in the line-circuit, irrespective of their duration, and means operated by a pulse of a third character in the main-line circuit for recording the signal.

55. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon each pulsation in the line-circuit, and means operated upon a pause in the main-line circuit for recording the signal.

56. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means operated upon a pause in the main-line circuit for recording the signal.

57. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon pulsations in the line-circuit, irrespective of their duration, and means operated upon a pause in the main-line circuit for recording the signal.

58. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon each pulsation in the line-circuit, and means operated upon a pause in the main-line circuit, while either open or closed, for recording the signal.

59. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, said means comprising two operating devices, one affected by relatively short pulses and the other by relatively longer pulses; step-by-step mechanism controlled thereby, arranged to continue movement of said signal member in the predetermined direction only, upon each pulsation in the line-circuit, and means operated upon a pause in the main-line circuit, while either open or closed, for recording the signal.

60. In electrical signaling apparatus, the combination with a signal member adapted to move in opposite directions, of means controlled by a change from the normal condition of the line-circuit for initially moving the signal member in one direction, and by a rapid change from, and back to, the normal condition in the line-circuit for initially moving the signal member in the other direction, step-by-step mechanism controlled thereby, arranged to continue movement of said signal member in the predetermined direction only, upon pulsations in the line-circuit, irrespective of their duration, and means operated upon a pause in the main-line circuit, while either open or closed, for recording the signal.

61. In electrical signaling apparatus, the combination with a primary relay, two local relays controlled thereby to move in accordance with different movements of the primary relay-armature, said local relays in circuit with points of said primary relay, and separate circuits controlled by the said local relays, of signal-producing means, and means controlled by the relays for operating the signal-producing means, differently in accordance with different conditions of the said local relay-circuits so controlled.

62. In electrical signaling apparatus, the combination with a primary relay, two local relays controlled thereby to operate, the one upon the commencement of movement of the primary relay-armature in one direction, and the other later in the movement thereof, said local relays in circuit with points of said primary relay, and separate circuits controlled by the said local relays, of signal-producing means, and means controlled by the relays for operating the signal-producing means, differently in accordance with different conditions of the said local relay-circuits so controlled.

63. In electrical signaling apparatus, the combination with a primary relay, two local relays controlled thereby to operate, the one upon the commencement of movement of the primary relay-armature in one direction, and the other later in the movement thereof in the same direction, said local relays in circuit with points of said primary relay, and separate circuits controlled by the said local relays, of signal-producing means, and means controlled by the relays for operating the signal-producing means, differently in accordance with different conditions of the said local relay-circuits so controlled.

64. In electrical signaling apparatus, the combination with a primary relay, of two local relays, the coils of one in circuit with points closed by the primary relay-armature when at substantially the limit of a full movement thereof in one direction, and the coils of the other in circuit with points closed by the said armature when at substantially the limit of a full movement thereof in the other direction, separate circuits controlled by the said local relays, signal-producing means, and means controlled by the relays for operating the signal-producing means, differently in accordance with different conditions of the said local relay-circuits so controlled.

65. In electrical signaling apparatus, the combination with a primary relay, of a local relay whose coils are in series circuit with points closed by its own armature when attracted, points closed by the primary relay-armature when at substantially the limit of a full movement thereof in one direction, and a generator; another local relay whose coils are in series circuit with points closed by the main-line relay-armature when at substantially the limit of a full movement thereof in the opposite direction, and with the generator; signal-producing means, and means controlled by the relays for operating the signal-producing means.

66. In electrical signaling apparatus, the combination with a single primary relay adapted to respond differently to current pulses of different strength or duration, two local relays in circuit with points thereof, and separate circuits controlled by said relays, of operating devices controlled by the said circuits differently in accordance with different current pulses through the primary relay, and means controlled thereby to determine the signal.

67. In electrical signaling apparatus, the combination with a single primary relay adapted to respond differently to current pulses of different strength or duration, of two local relays controlled thereby and separate circuits controlled by said relays, of operating devices including separate operating and escapement magnets controlled by the said circuits differently in accordance with different current pulses through the primary relay, and means controlled thereby to determine the signal.

68. In electrical signaling apparatus, the combination with two operating devices, of a single neutral primary relay operated by a relatively short current pulse in its circuit to cause one of said operating devices to act, and operated by a relatively longer pulse to cause the other of said operating devices to act.

69. In electrical signaling apparatus, the combination with two operating devices, of a single neutral primary relay operated by a quick break and make of its circuit to cause one of said operating devices to act, and operated by a break only in its circuit to cause the other of said operating devices to act.

70. In electrical signaling apparatus, the combination with a signal member adapted to move in opposite directions, of means controlled by the character of a current pulse in the line-circuit for initially determining in which direction the signal member shall move, and step-by-step mechanism controlled thereby, arranged to continue movement of said signal member in such predetermined direction only, upon each pulsation in the line-circuit.

71. In electrical signaling apparatus, the combination with a signal member adapted to move in opposite directions, of means controlled by the character of a current pulse in the line-circuit for initially determining in which direction the signal member shall move, step-by-step mechanism controlled thereby, arranged to continue movement of said signal member in such predetermined direction only, upon each pulsation in the line-circuit, and means operated upon a pause in the main-line circuit for recording the signal.

72. In electrical signaling apparatus, the combination with a signal member adapted to move in opposite directions, of means controlled by the character of a current pulse in the line-circuit for initially moving the signal member in one direction or the other, and step-by-step mechanism controlled thereby, arranged to continue movement of said signal member in the direction in which it has been moved only, upon each pulsation in the line-circuit.

73. In electrical signaling apparatus, the combination with a signal member adapted to move in opposite directions, of means controlled by the character of a current pulse in the line-circuit for initially moving the signal member in one direction or the other, step-by-step mechanism controlled thereby, arranged to continue movement of said signal member in the direction in which it has been moved only, upon each pulsation in the line-circuit, and means operated upon a pause in the main-line circuit for recording the signal.

74. In electrical signaling apparatus, the combination with a signal member adapted to move in opposite directions, of means controlled by the duration of the initial current pulse of a signal in the line-circuit for initially determining in which direction the signal member shall move, and step-by-step mechanism controlled thereby, arranged to continue movement of said signal member in such predetermined direction only, upon each pulsation in the line-circuit.

75. In electrical signaling apparatus, the combination with a signal member adapted to move in opposite directions, of means controlled by the duration of the initial current pulse of a signal in the line-circuit for initially determining in which direction the signal member shall move, said means comprising two operating devices, one affected by relatively short pulses and the other by relatively longer pulses; and step-by-step mechanism controlled thereby, arranged to continue movement of said signal member in such predetermined direction only, upon each pulsation in the line-circuit.

76. In electrical signaling apparatus, the combination with a signal member adapted to move in opposite directions, of means controlled by the duration of the initial current pulse of a signal in the line-circuit for initially determining in which direction the signal member shall move, step-by-step mechanism controlled thereby, arranged to continue movement of said signal member in such predetermined direction only, upon each pulsation in the line-circuit, and means operated upon a pause in the main-line circuit for recording the signal.

77. In electrical signaling apparatus, the combination with a signal member adapted to move in opposite directions, of means controlled by the duration of the initial current pulse of a signal in the line-circuit for initially determining in which direction the signal member shall move, said means comprising two operating devices, one affected by relatively short pulses and the other by relatively longer pulses; step-by-step mechanism controlled thereby, arranged to continue movement of said signal member in such predetermined direction only, upon each pulsation in the line-circuit, and means operated upon a pause in the main-line circuit for recording the signal.

78. In electrical signaling apparatus, the combination with a signal member adapted to move in opposite directions, of means controlled by the duration of the initial current pulse of a signal in the line-circuit for initially moving the signal member in one direction or the other, and step-by-step mechanism controlled thereby, arranged to continue movement of said signal member in the direction in which it has been moved only, upon each pulsation in the line-circuit.

79. In electrical signaling apparatus, the combination with a signal member adapted to move in opposite directions, of means controlled by the duration of the initial current pulse of a signal in the line-circuit for initially moving the signal member in one direction or the other, said means comprising two operating devices, one affected by relatively short pulses and the other by relatively longer pulses; and step-by-step mechanism controlled thereby, arranged to continue movement of said signal member in the direction in which it has been moved only, upon each pulsation in the line-circuit.

80. In electrical signaling apparatus, the combination with a signal member adapted to move in opposite directions, of means controlled by the duration of the initial current pulse of a signal in the line-circuit for initially moving the signal member in one direction or the other, step-by-step mechanism controlled thereby, arranged to continue movement of said signal member in the direction in which it has been moved only, upon each pulsation in the line-circuit, and means operated upon a pause in the main-line circuit for recording the signal.

81. In electrical signaling apparatus, the combination with a signal member adapted to move in opposite directions, of means controlled by the duration of the initial current pulse of a signal in the line-circuit for initially moving the signal member in one direction or the other, said means comprising two operating devices, one affected by relatively short pulses and the other by relatively longer pulses; step-by-step mechanism controlled thereby, arranged to continue movement of said signal member in the direction in which it has been moved only, upon each pulsation in the line-circuit, and means operated upon a pause in the main-line circuit for recording the signal.

82. In electrical signaling apparatus, the combination with a signal member adapted to move in opposite directions, of means controlled by the character of the initial current pulse of a signal in the line-circuit for initially determining in which direction the signal member shall move, and step-by-step mechanism controlled thereby, arranged to continue movement of said signal member in such predetermined direction only, upon each pulsation in the line-circuit.

83. In electrical signaling apparatus, the combination with a signal member adapted to move in opposite directions, of means controlled by the character of the initial current pulse of a signal in the line-circuit for initially determining in which direction the signal member shall move, step-by-step mechanism controlled thereby, arranged to continue movement of said signal member in such predetermined direction only, upon each pulsation in the line-circuit, and means operated upon a pause in the main-line circuit for recording the signal.

84. In electrical signaling apparatus, the combination with a signal member adapted to move in opposite directions, of means controlled by the character of the initial current pulse of a signal in the line-circuit for initially moving the signal member in one direction or the other, and step-by-step mechanism controlled thereby, arranged to continue movement of said signal member in the direction in which it has been moved only, upon each pulsation in the line-circuit.

85. In electrical signaling apparatus, the combination with a signal member adapted to move in opposite directions, of means controlled by the character of the initial current pulse of a signal in the line-circuit for initially moving the signal member in one direction or the other, step-by-step mechanism controlled thereby, arranged to continue movement of said signal member in the direction in which it has been moved only, upon each pulsation in the line-circuit, and means operated upon a pause in the main-line circuit for recording the signal.

86. In electrical signaling apparatus, the combination with a signal member adapted to move in opposite directions, of operating mechanism for moving the signal member in one direction or the other, selecting means normally set to select one direction only as the direction the signal member shall be moved by the operating mechanism, means operated by signal current pulses of a certain character for reversing such selecting means so as to change the direction that the signal member shall be moved by the operating mechanism, and resetting means for restoring the selecting means to normal position upon the completion of signals.

87. In electrical signaling apparatus, the combination with a signal member adapted to move in opposite directions, of operating mechanism for moving the signal member in one direction or the other, selecting means normally set to select one direction only as the direction the signal member shall be moved by the operating mechanism, primary controlling means arranged to maintain such selecting means in its initial condition or to reverse the same according to the character of the signal current pulses so as to change the direction that the signal member shall be moved by the operating mechanism, and resetting means for restoring the selecting means to normal position upon the completion of signals.

88. In electrical signaling apparatus, the combination with a signal member adapted to move in opposite directions, of two operating devices for said signal member, arranged to so move the same, and a primary controlling device adapted to be operated by an electric current and arranged to determine which of said operating devices shall operate said signal member, according to the character of the initial current pulse of each signal, said operating devices each arranged when operated to continue the motion of said signal member in one direction until the transmission of the signal is completed.

89. In electrical signaling apparatus, the combination with a signal member adapted to move in opposite directions, of two electrically-operated operating mechanisms for said signal member, arranged to move the same in opposite directions, local circuits therefor, and a primary relay controlling said local circuits, and itself controlled by a primary circuit, said primary relay arranged to cause the operation of one or the other of said operating mechanisms, according to the character of the initial current pulse of each signal transmitted through said primary circuit.

90. In electrical signaling apparatus, the combination with a type-carrier adapted to move in opposite directions, of means controlled by the duration of a current pulse in the line-circuit for initially determining in which direction the type-carrier shall move, step-by-step mechanism controlled thereby, arranged to continue movement of said type-carrier in such predetermined direction only, upon each pulsation in the line-circuit, and means for printing the character upon the type-carrier thus selected.

91. In electrical signaling apparatus, the combination with a type-carrier adapted to move in opposite directions, of means controlled by the duration of a current pulse in the line-circuit for initially determining in which direction the type-carrier shall move, said means comprising two operating devices, one affected by relatively short pulses and the other by relatively longer pulses; step-by-step mechanism controlled thereby, arranged to continue movement of said type-carrier in such predetermined direction only, upon each pulsation in the line-circuit, and means for printing the character upon the type-carrier thus selected.

92. In electrical signaling apparatus, the combination with a type-carrier adapted to move in opposite directions, of means controlled by the duration of a current pulse in the line-circuit for initially determining in which direction the type-carrier shall move, step-by-step mechanism controlled thereby, arranged to continue movement of said type-carrier in such predetermined direction only, upon each pulsation in the line-circuit, and means operated upon a pause in the main-line circuit for printing the character upon the type-carrier thus selected.

93. In electrical signaling apparatus, the combination with a type-carrier adapted to move in opposite directions, of means controlled by the duration of a current pulse in the line-circuit for initially determining in which direction the type-carrier shall move, said means comprising two operating devices, one affected by relatively short pulses and the other by relatively longer pulses; step-by-step mechanism controlled thereby, arranged to continue movement of said type-carrier in such predetermined direction only, upon each pulsation in the line-circuit, and means operated upon a pause in the main-line circuit for printing the character upon the type-carrier thus selected.

94. In electrical signaling apparatus, the combination with a type-carrier adapted to move in opposite directions, of means controlled by the duration of a current pulse in the line-circuit for initially moving the type-carrier in one direction or the other, step-by-step mechanism controlled thereby, arranged to continue movement of said type-carrier in the direction in which it has been moved only, upon each pulsation in the line-circuit, and means for printing the character upon the type-carrier thus selected.

95. In electrical signaling apparatus, the combination with a type-carrier adapted to move in opposite directions, of means controlled by the duration of a current pulse in the line-circuit for initially moving the type-carrier in one direction or the other, said means comprising two operating devices, one affected by relatively short pulses and the other by relatively longer pulses; step-by-step mechanism controlled thereby, arranged to continue movement of said type-carrier in the direction in which it has been moved only, upon each pulsation in the line-circuit, and means for printing the character upon the type-carrier thus selected.

96. In electrical signaling apparatus, the combination with a type-carrier adapted to move in opposite directions, of means controlled by a change from the normal condition of the line-circuit for initially determining that the type-carrier shall move in one direction, and by a rapid change from, and back to, the normal condition in the line-circuit for initially determining that the type-carrier shall move in the other direction, step-by-step mechanism controlled thereby, arranged to continue movement of said type-carrier in the predetermined direction only, upon each pulsation in the line-circuit, and means for printing the character upon the type-carrier thus selected.

97. In electrical signaling apparatus, the combination with a type-carrier adapted to move in opposite directions, of means controlled by a change from the normal condition of the line-circuit for initially determining that the type-carrier shall move in one direction, and by a rapid change from, and back to, the normal condition in the line-circuit for initially determining that the type-carrier shall move in the other direction, said means comprising two operating devices, one affected by relatively short pulses and the other by relatively longer pulses; step-by-step mechanism controlled thereby, arranged to continue movement of said type-carrier in the predetermined direction only, upon each pulsation in the line-circuit, and means for printing the character upon the type-carrier thus selected.

98. In electrical signaling apparatus, the combination with a type-carrier adapted to move in opposite directions, of means controlled by a change from the normal condition of the line-circuit for initially moving the type-carrier in one direction, and by a rapid change from, and back to, the normal condition in the line-circuit for initially moving the type-carrier in the other direction, step-by-step mechanism controlled thereby, arranged to continue movement of said type-carrier in the predetermined direction only, upon each pulsation in the line-circuit, and means for printing the character upon the type-carrier thus selected.

99. In electrical signaling apparatus, the combination with a type-carrier adapted to move in opposite directions, of means controlled by a change from the normal condition of the line-circuit for initially moving the type-carrier in one direction, and by a rapid change from, and back to, the normal condition in the line-circuit for initially moving the type-carrier in the other direction, said means comprising two operating devices, one affected by relatively short pulses and the other by relatively longer pulses; step-by-step mechanism controlled thereby, arranged to continue movement of said type-carrier in the predetermined direction only, upon each pulsation in the line-circuit, and means for printing the character upon the type-carrier thus selected.

100. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon each pulsation in the line-circuit, and means operated upon a pause in the main-line circuit for recording the signal and for returning the signal member to its normal position.

101. In electrical signaling apparatus, the combination with a signal member adapted to move in opposite directions, of means controlled by the duration of a current pulse in the line-circuit for initially determining in which direction the signal member shall move, step-by-step mechanism controlled thereby, arranged to continue movement of said signal member in such predetermined direction only, upon each pulsation in the line-circuit, and means operated upon a pause in the main-line circuit, while either open or closed, for recording the signal and for returning the signal member to its normal position.

102. In electrical signaling apparatus, the combination with a primary relay, and a signal member adapted to be operated in opposite directions, of two operating devices therefor, either one adapted to be operated, upon the operation of a local relay, a local relay, operated in one direction only by the action of the primary relay, a switch-relay, for connecting either one or other of said operating devices into a local circuit controlled by said local relay, a shift-relay, adapted to be operated in either direction by action of the main relay, and to control the operation in one direction only of the switch-relay, and a restoring-relay, for restoring the said local and switch relays to their normal conditions.

103. In electrical signaling apparatus, the combination with a primary relay, and a signal member adapted to be operated in opposite directions, of two operating devices therefor, either one adapted to be operated, upon the operation of a local relay, a local relay, operated in one direction only by the action of the primary relay, a switch-relay, for connecting either one or other of said operating devices into local circuit controlled by said local relay, a shift-relay, adapted to be operated in either direction by action of the main relay, and to control the operation in one direction only of the switch-relay, printing mechanism, and a restoring-relay for operating the printing mechanism and restoring the said local and switch relays to their normal conditions.

104. In electrical signaling apparatus, the combination with a signal member adapted to move in opposite directions, and two operating devices therefor, adapted to so operate the same, of a primary relay, a switch-relay controlled thereby, and two circuits therefor, closed, the one in one position of the armature of the switch-relay, and the other in the opposite position thereof, each circuit operating one of said operating devices.

105. In electrical signaling apparatus, the combination with a signal member adapted to move in opposite directions, and two operating devices therefor, adapted to so operate the same, of a primary relay, a switch-relay controlled thereby, two circuits therefor, closed, the one in one position of the armature of the switch-relay, and the other in the opposite position thereof, each circuit operating one of said operating devices, and other relays intermediate the primary and switch relays and arranged to operate the switch-relay differently, according as the primary relay is operated.

106. In electrical signaling apparatus, the combination with a signal member adapted to move in opposite directions, and two operating devices therefor, adapted to so operate the same, of a primary relay, a switch-relay controlled thereby, two circuits therefor, closed, the one in one position of the armature of the switch-relay, and the other in the opposite position thereof, each circuit operating one of said operating devices, other relays intermediate the primary and switch relays and arranged to operate the switch-relay differently, according as the primary relay is operated, and a printing-relay.

107. In electrical signaling apparatus, the combination with a signal member adapted to move in opposite directions, and two operating devices therefor, adapted to so operate the same, of a primary relay, a switch-relay controlled thereby, two circuits therefor, closed, the one in one position of the armature of the switch-relay, and the other in the opposite position thereof, each circuit operating one of said operating devices, other relays intermediate the primary and switch relays and arranged to operate the switch-relay differently, according as the primary relay is operated, and a printing-relay provided with restoring means.

108. In electrical signaling apparatus, the combination with a signal member adapted to move in opposite directions, and two operating devices therefor, adapted to so operate the same, of a primary relay, a switch-relay controlled thereby in accordance with the character of the initial movement of the primary relay, and two circuits therefor, closed, the one in one position of the armature of the switch-relay, and the other in the opposite position thereof, each circuit operating one of said operating devices.

109. In electrical signaling apparatus, the combination with a signal member adapted to move in opposite directions, and two operating devices therefor, adapted to so operate the same, of a primary relay, a switch-relay controlled thereby in accordance with the character of the initial movement of the primary relay, two circuits therefor, closed, the one in one position of the armature of the switch-relay, and the other in the opposite position thereof, each circuit operating one of said operating devices, and other relays intermediate the primary and switch relays and arranged to operate the switch-relay differently, according as the primary relay is operated.

110. In electrical signaling apparatus, the combination with a signal member adapted to move in opposite directions, and two operating devices therefor, adapted to so operate the same, of a primary relay, a switch-relay controlled thereby in accordance with the character of the initial movement of the primary relay, two circuits therefor, closed, the one in one position of the armature of the switch-relay, and the other in the opposite position thereof, each circuit operating one of said operating devices, other relays intermediate the primary and switch relays and arranged to operate the switch-relay differently, according as the primary relay is operated, and a printing-relay.

111. In electrical signaling apparatus, the combination with a signal member adapted to move in opposite directions, and two operating devices therefor, adapted to so operate the same, of a primary relay, a switch-relay controlled thereby in accordance with the character of the initial movement of the primary relay, two circuits therefor, closed, the one in one position of the armature of the switch-relay, and the other in the opposite position thereof, each circuit operating one of said operating devices, other relays intermediate the primary and switch relays and arranged to operate the switch-relay differently, according as the primary relay is operated, and a printing-relay provided with restoring means.

112. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby to determine in which direction the signal member shall be moved by the operating mechanism, and two circuits therefor, closed, the one in one position of the armature of the switch-relay, and the other in the opposite position thereof.

113. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby to determine in which direction the signal member shall be moved by the operating mechanism, two circuits therefor, closed, the one in one position of the armature of the switch-relay, and the other in the opposite position thereof, and other relays intermediate the primary and switch relays and arranged to operate the switch-relay differently, according as the primary relay is operated.

114. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby to determine in which direction the signal member shall be moved by the operating mechanism, two circuits therefor, closed, the one in one position of the armature of the switch-relay, and the other in the opposite position thereof, other relays intermediate the primary and switch relays and arranged to operate the switch-relay differently, according as the primary relay is operated, and a printing-relay.

115. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby to determine in which direction the signal member shall be moved by the operating mechanism, two circuits therefor, closed, the one in one position of the armature of the switch-relay, and the other in the opposite position thereof, other relays intermediate the primary and switch relays and arranged to operate the switch-relay differently, according as the primary relay is operated, and a printing-relay provided with restoring means.

116. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby in accordance with the character of the initial movement of the primary relay to determine in which direction the signal member shall be moved by the operating mechanism, and two circuits therefor, closed, the one in one position of the armature of the switch-relay, and the other in the opposite position thereof.

117. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby in accordance with the character of the initial movement of the primary relay to determine in which direction the signal member shall be moved by the operating mechanism, two circuits therefor, closed, the one in one position of the armature of the switch-relay, and the other in the opposite position thereof, and other relays intermediate the primary and switch relays and arranged to operate the switch-relay differently, according as the primary relay is operated.

118. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby in accordance with the character of the initial movement of the primary relay to determine in which direction the signal member shall be moved by the operating mechanism, two circuits therefor, closed, the one in one position of the armature of the switch-relay, and the other in the opposite position thereof, other relays intermediate the primary and switch relays and arranged to operate the switch-relay differently, according as the primary relay is operated, and a printing-relay.

119. In electrical signaling apparatus, the combination with a signal member adapted to move in opposite directions, and operating mechanism therefor, adapted to so operate the same, of electrically-controlled step-by-step mechanism mechanically controlling the motion of said signal member, contacts operated by the initial movement of the said operating mechanism to bring the step-by-step mechanism into operative relation therewith, a primary relay, a switch-relay controlled thereby in accordance with the character of the initial movement of the primary relay to determine in which direction the signal member shall be moved by the operating mechanism, two circuits therefor, closed, the one in one position of the armature of the switch-relay, and the other in the opposite position thereof, other relays intermediate the primary and switch relays and arranged to operate the switch-relay differently, according as the primary relay is operated, and a printing-relay provided with restoring means.

120. In electrical signaling apparatus, the combination with a signal member, operating means therefor, including a moving element adapted to mechanically move said signal member, and a primary relay controlling said operating means, of electrically-controlled step-by-step mechanism for controlling the movements of said moving element after its initial movement, said moving element adapted to receive an initial movement prior to the control thereof by said step-by-step mechanism, and contacts operated by the initial movement of said moving element to bring said step-by-step mechanism into operative relation with the said operating means.

121. In electrical signaling apparatus, the combination with a signal member, operating means therefor, including a moving element adapted to mechanically move said signal member, and a primary relay controlling said operating means, of electrically-controlled step-by-step mechanism for controlling the movements of said moving element after its initial movement, said moving element adapted to receive an initial movement prior to the control thereof by said step-by-step mechanism, contacts operated by the initial movement of said moving element to bring said step-by-step mechanism into operative relation with the said operating means, and printing mechanism.

122. In electrical signaling apparatus, the combination with a signal member, operating means therefor, including a moving element adapted to mechanically move said signal member, and a primary relay controlling said operating means, of electrically-controlled step-by-step mechanism for controlling the movements of said moving element after its initial movement, said moving element adapted to receive an initial movement prior to the control thereof by said step-by-step mechanism, contacts operated by the initial movement of said moving element to bring said step-by-step mechanism into operative relation with the said operating means, printing mechanism and restoring means.

123. In electrical signaling apparatus, the combination with a signal member, operating means therefor, including a moving element adapted to mechanically move said signal member, and a primary relay controlling said operating means, of electrically-controlled step-by-step mechanism for controlling the movements of said moving element after its initial movement, said moving element adapted to receive an initial movement prior to the control thereof by said step-by-step mechanism, contacts operated by the initial movement of said moving element to bring said step-by-step mechanism into operative relation with the said operative means, and printing mechanism provided with restoring means.

124. In electrical signaling apparatus, the combination with a signal member, operating means therefor, including a moving element adapted to mechanically move said signal member, and a primary relay controlling said operating means, of electrically-controlled step-by-step mechanism for controlling the movements of said moving element after its initial movement, said moving element adapted to receive an initial movement prior to the control thereof by said step-by-step mechanism, printing mechanism, and line-spacing mechanism.

125. In electrical signaling apparatus, the combination with a signal member, operating means therefor, including a moving element adapted to mechanically move said signal member, and a primary relay controlling said operating means, of electrically-controlled step-by-step mechanism for controlling the movements of said moving element after its initial movement, said moving element adapted to receive an initial movement prior to the control thereof by said step-by-step mechanism, contacts operated by the initial movement of said moving element to bring said step-by-step mechanism into operative relation with the said operating means, printing mechanism comprising means for forward-spacing and back-spacing mechanism.

126. In electrical signaling apparatus, the combination with a signal member, electrically-controlled operating means therefor, including a moving element adapted to mechanically move said signal member, and a primary relay controlling said operating means, of electrically-controlled step-by-step mechanism for controlling the movement of said moving element after its initial movement, said moving element adapted to receive an initial movement prior to the control thereof by said step-by-step mechanism, contacts operated by the initial movement of said moving element to bring the step-by-step mechanism into operative relation with the said operating means, printing mechanism, and contacts operated by further movement of the said moving element to bring the printing mechanism into operative relation.

127. In electrical signaling apparatus, the combination with a signal member, electrically-controlled operating means therefor, including a moving element adapted to mechanically move said signal member, and a primary relay controlling said operating means, of electrically-controlled step-by-step mechanism for controlling the movement of said moving element after its initial movement, said moving element adapted to receive an initial movement prior to the control thereof by said step-by-step mechanism, contacts operated by the initial movement of said moving element to bring the step mechanism into operative relation with the said operating means, printing mechanism, operated by further movement of the said moving element to bring the printing mechanism into operative relation, and restoring means.

128. In electrical signaling apparatus, the combination with a signal member, electrically-controlled operating means therefor, including a moving element adapted to mechanically move said signal member, and a primary relay controlling said operating means, of electrically-controlled step-by-step mechanism for controlling the movement of said moving element after its initial movement, said moving element adapted to receive an initial movement prior to the control thereof by said step-by-step mechanism, contacts operated by the initial movement of said moving element to bring the step-by-step mechanism into operative relation with the said operating means, printing mechanism, and contacts operated by further movement of the said moving element to bring the printing mechanism into operative relation, printing and restoring mechanism, and contacts, operated by further movement of the said moving element, to bring the printing and restoring mechanism into operative relation.

129. In electrical signaling apparatus, the combination with a signal member adapted to move in opposite directions, and operating mechanism therefor, adapted to so operate same, of electrically-controlled step-by-step mechanism mechanically controlling the motion of the said signal member, contacts operated by the initial movement of the said operating mechanism to bring the step-by-step mechanism into operative relation therewith, printing mechanism, contacts operated upon further movement of the operating mechanism to bring the printing mechanism into operative relation, a primary relay, a switch-relay controlled thereby to determine in which direction the signal member shall be moved by the operating mechanism, and two circuits therefor, closed, the one in one position of the armature of the switch-relay and the other in the opposite position thereof.

130. In electrical signaling apparatus, the combination with a signal member adapted to move in opposite directions, and operating mechanism therefor, adapted to so operate same, of electrically-controlled step-by-step mechanism mechanically controlling the motion of the said signal member, contacts operated by the initial movement of the said operating mechanism to bring the step-by-step mechanism into operative relation therewith, printing and restoring mechanism, contacts operated upon further movement of the operating mechanism to bring the printing and restoring mechanism into operative relation, a primary relay, a switch-relay controlled thereby to determine in which direction the signal member shall be moved by the operating mechanism, and two circuits therefor, closed, the one in one position of the armature of the switch-relay and the other in the opposite position thereof.

131. In electrical signaling apparatus, the combination with a signal member adapted to move in opposite directions, and operating mechanism therefor, adapted to so operate same, of electrically-controlled step-by-step mechanism mechanically controlling the motion of the said signal member, contacts operated by the initial movement of the said operating mechanism to bring the step-by-step mechanism into operative relation therewith, printing mechanism, contacts operated upon further movement of the operating mechanism to bring the printing mechanism into operative relation, a primary relay, a switch-relay controlled thereby in accordance with the character of the initial movement of the primary relay, to determine in which direction the signal member shall be moved by the operating mechanism, and two circuits therefor, closed, the one in one position of the armature of the switch-relay and the other in the opposite position thereof.

132. In electrical signaling apparatus, the combination with a signal member adapted to move in opposite directions, and operating mechanism therefor, adapted to so operate same, of electrically-controlled step-by-step mechanism mechanically controlling the motion of the said signal member, contacts operated by the initial movement of the said operating mechanism to bring the step-by-step mechanism into operative relation therewith, printing and restoring mechanism, contacts operated upon further movement of the operating mechanism to bring the printing and restoring mechanism into operative relation, a primary relay, a switch-relay controlled thereby to determine in which direction the signal member shall be moved by the operating mechanism, and two circuits therefor, closed, the one in one position of the armature of the switch-relay and the other in the opposite position thereof.

133. In electrical signaling apparatus, the combination with a signal member adapted to move in opposite directions, and operating mechanism therefor, adapted to so operate the same, of line-spacing mechanism operated upon a movement of the signal member in one direction, and back-spacing mechanism operated upon a movement of the signal member in the other direction.

134. In electrical signaling apparatus, the combination with a signal member adapted to move in opposite directions, and operating mechanism therefor, adapted to so operate the same, of line-spacing mechanism operated upon a movement of the signal member in one direction to the limit of its travel, and back-spacing mechanism operated upon a movement of the signal member in the corresponding other direction.

135. In electrical signaling apparatus, the combination with a signal member, means for operating same to bring various signal characters thereon opposite a printing-point, and printing mechanism therefor, of back-spacing mechanism operated upon a predetermined movement of the signal member, and means for preventing the operation of the printing mechanism when the back-spacing mechanism is operated.

136. In electrical signaling apparatus, the combination with a signal member, means for operating same to bring various signal characters thereon opposite a printing-point, and printing mechanism therefor, of back-spacing mechanism controlled to be operated when the signal member reaches the limit of its movement away from normal position, and means for preventing the operation of the printing mechanism when the back-spacing mechanism is operated.

137. In electrical signaling apparatus, the combination with a signal member, means for operating same to bring various signal characters thereon opposite a printing-point, and printing and letter-spacing mechanism, of back-spacing mechanism operated upon a predetermined movement of the signaling member, means for preventing the operation of the letter-spacing mechanism when the back-spacing mechanism is operated, and restoring means operated upon the operation of the back-spacing mechanism.

138. In electrical signaling apparatus, the combination with a signal member, means for operating same to bring various signal characters thereon opposite a printing-point, and printing and letter-spacing mechanism, and a restoring-circuit normally operated by the printing and letter-spacing mechanism in its operation, of back-spacing mechanism, means for preventing the operation of the letter-spacing mechanism when the back-spacing mechanism is operated, and means operated upon the operation of the back-spacing mechanism for operating the said restoring-circuit.

139. In electrical signaling apparatus, the combination with a signal member, means for operating same to bring various signal characters thereon opposite a printing-point, and printing and letter-spacing mechanism, and a restoring-circuit normally closed by the printing and letter-spacing mechanism in its operation, of back-spacing mechanism, means for preventing the operation of the letter-spacing mechanism when the back-spacing mechanism is operated, and contacts, closed upon operation of the back-spacing mechanism, to close the restoring-circuit.

140. In electrical signaling apparatus, the combination with a signal member adapted to move in opposite directions, and operating mechanism therefor, adapted to so operate the same, of line-spacing mechanism operated upon a movement of the signal member in one direction, back-spacing mechanism operated upon a movement of the signal member in the other direction, printing and letter-spacing mechanism, and means for preventing the operation of the letter-spacing mechanism when the back-spacing mechanism is operated.

141. In electrical signaling apparatus, the combination with a signal member adapted to move in opposite directions, and operating mechanism therefor, adapted to so operate the same, of line-spacing mechanism operated upon a movement of the signal member in one direction, back-spacing mechanism operated upon a movement of the signal member in the other direction, printing and letter-spacing mechanism, means for preventing the operation of the letter-spacing mechanism when the back-spacing mechanism is operated, and restoring means operated upon the operation of the back-spacing mechanism.

142. In electrical signaling apparatus, the combination with a signal member, means for operating same to bring various signal characters thereon opposite a printing-point, and printing mechanism therefor, of a motor, thrown into operation upon a predetermined movement of the signal member, and a paper-carriage connected to the motor to move in one direction against spring-actuation in the other, when the said motor is operated.

143. In electrical signaling apparatus, the combination with a signal member, means for operating same to bring various signal characters thereon opposite a printing-point, and printing and letter-spacing mechanism, of a motor, operatively connected upon a predetermined movement of the signal member, a paper-carriage connected to the motor to move in one direction, against spring-actuation in the other, when the said motor is operated, and restoring means operated concurrently with the printing and letter-spacing mechanism.

144. In electrical signaling apparatus, the combination with a signal member adapted to move in opposite directions, and operating mechanism therefor, adapted to so operate the same, of a motor, line-spacing mechanism adapted to be operated by said motor upon a movement of the signal member in one direction, and back-spacing mechanism adapted to be operated by said motor upon a movement of the signal member in the other direction.

145. In electrical signaling apparatus, the combination with a signal member adapted to move in opposite directions, and operating mechanism therefor, adapted to so operate the same, of a motor, line-spacing mechanism adapted to be operated by said motor upon a movement of the signal member in one direction to the limit of its travel, and back-spacing mechanism adapted to be operated by said motor upon a movement of the signal member in the corresponding other direction.

146. In electrical signaling apparatus, the combination with a signal member adapted to move in opposite directions, and operating mechanism therefor, adapted to so operate the same, of a motor, line-spacing mechanism normally connected to said motor, and adapted to be operated upon operation of said motor, back-spacing mechanism, a clutch arranged upon operation to disconnect the motor from said line-spacing mechanism and connect same with said back-spacing mechanism, and means arranged upon operation of the signal member in one direction to operate the clutch and the motor, and upon operation of the signal member in the other direction to operate the motor while leaving the clutch at normal.

147. In electrical signaling apparatus, the combination with a signal member adapted to move in opposite directions, and operating mechanism therefor, adapted to so operate the same, of a motor, local circuits operated upon a movement of the signal member to the limit of its travel in either direction for operatively connecting the motor, line-spacing mechanism, back-spacing mechanism, a clutch for connecting said line-spacing mechanism or said back-spacing mechanism with said motor, and means controlled by the operation of the signal member in one direction or the other to determine which of said mechanisms shall be connected to the motor by said clutch.

148. In electrical signaling apparatus, the combination with a signal member adapted to move in opposite directions, and operating mechanism therefor, adapted to so operate the same, of a motor, line-spacing mechanism, back-spacing mechanism, a local circuit, operated upon movement of the signal member in one direction for operatively connecting the motor with the line-spacing mechanism, and another local circuit operated upon movement of the signal member in the other direction for operatively connecting the motor with the back-spacing mechanism.

149. In electrical signaling apparatus, the combination with a primary relay, a signal member, operating mechanism therefor, normally controlled by operation of the primary relay, a paper-carriage, a line-spacing device for the paper therein, and printing and letter-spacing mechanism, of means controlled by a movement of the signal member to line-space and to return the carriage to an initial position to commence a new line of printing, means operated upon such movement of the carriage, to restore the signal member to a normal position and to disconnect the operating mechanism from control of the primary relay, and means then operated under control of the primary relay for operating the line-spacing device.

150. In electrical signaling apparatus, the combination with a primary relay, a signal member, operating mechanism therefor, normally controlled by operation of the primary relay, a paper-carriage, a line-spacing device for the paper therein, and printing and letter-spacing mechanism, of means controlled by a movement of the signal member to line-space and to return the carriage to an initial position to commence a new line of printing, means operated upon such movement of the carriage, to restore the signal member to a normal position and to disconnect the operating mechanism from control of the primary relay, and means then operated under control of the primary relay for consecutively operating the line-spacing device.

151. In electrical signaling apparatus, the combination with a primary relay, a signal member, operating mechanism therefor, normally controlled by operation of the primary relay, a paper-carriage, a line-spacing device for the paper therein, and printing and letter-spacing mechanism, of means controlled by a movement of the signal member to line-space and to return the carriage to an initial position to commence a new line of printing, means operated upon such movement of the carriage, to restore the signal member to a normal position and to disconnect the operating mechanism from control of the primary relay, means then operated under control of the primary relay for consecutively operating the line-spacing device, and means for operating the letter-spacing mechanism upon completion of the operation of the line-spacing device.

152. In electrical signaling apparatus, the combination with a primary relay, and a local relay whose coils are in local circuit with contacts controlled by its own armature in series with contacts controlled by the armature of the primary relay and with a generator, of signal-operating mechanism controlled by said local relay, and restoring means independent of the said local circuit for restoring the local-relay armature to normal position after each signal.

IRA A. MICHAEL.

Witnesses:
H. J. DETTMAN,
JNO. LAPPERRE.